US012296613B2

(12) United States Patent
Hofer et al.

(10) Patent No.: US 12,296,613 B2
(45) Date of Patent: May 13, 2025

(54) OPTICALLY VARIABLE SECURITY ELEMENT

(71) Applicant: GIESECKE+DEVRIENT CURRENCY TECHNOLOGY GMBH, Munich (DE)

(72) Inventors: Moritz Hofer, Munich (DE); Christian Fuhse, Otterfing (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 18/558,831

(22) PCT Filed: Apr. 4, 2022

(86) PCT No.: PCT/EP2022/025130
§ 371 (c)(1),
(2) Date: Nov. 3, 2023

(87) PCT Pub. No.: WO2022/233450
PCT Pub. Date: Nov. 10, 2022

(65) Prior Publication Data
US 2024/0217254 A1 Jul. 4, 2024

(30) Foreign Application Priority Data
May 3, 2021 (DE) ..................... 10 2021 002 335.8

(51) Int. Cl.
*B42D 25/324* (2014.01)
*B42D 25/29* (2014.01)
(Continued)

(52) U.S. Cl.
CPC ............ *B42D 25/324* (2014.10); *B42D 25/29* (2014.10); *B42D 25/364* (2014.10); *B42D 25/373* (2014.10)

(58) Field of Classification Search
CPC ..... B42D 25/324; B42D 25/373; B42D 25/29
(Continued)

(56) References Cited

U.S. PATENT DOCUMENTS

| | | | |
|---|---|---|---|
| 8,343,615 | B2 | 1/2013 | Raksha et al. |
| 9,257,059 | B2 | 2/2016 | Raksha et al. |

(Continued)

FOREIGN PATENT DOCUMENTS

| | | | |
|---|---|---|---|
| DE | 102005061749 | A1 | 7/2007 |
| DE | 102010025775 | A1 | 1/2012 |

(Continued)

OTHER PUBLICATIONS

German Search Report from corresponding German Patent Application No. DE102021002335.8, Jan. 31, 2022.

(Continued)

*Primary Examiner* — Justin V Lewis
(74) *Attorney, Agent, or Firm* — Workman Nydegger

(57) ABSTRACT

An optically variable security element has a motif region. A plurality of differently oriented facets are arranged in the motif region. A pattern includes visible pattern elements is visible in the motif region to a viewer at least at a first viewing angle. The visible pattern elements are designed differently to portray a motif to the viewer. The motif is a three-dimensional motif. The pattern elements are designed differently such that they portray a perspective of the three-dimensional motif to the viewer.

17 Claims, 14 Drawing Sheets

(51) Int. Cl.
*B42D 25/373* (2014.01)
*B42D 25/364* (2014.01)

(58) Field of Classification Search
USPC ................................ 283/72, 94, 98, 99, 901
See application file for complete search history.

(56) References Cited

U.S. PATENT DOCUMENTS

| | | | | |
|---|---|---|---|---|
| 9,827,802 | B2 | 11/2017 | Fuhse et al. | |
| 10,173,455 | B2 | 1/2019 | Raksha et al. | |
| 10,259,252 | B2 | 4/2019 | Attner et al. | |
| 10,525,758 | B2 | 1/2020 | Fuhse et al. | |
| 10,525,759 | B2 | 1/2020 | Rahm et al. | |
| 10,639,925 | B2 | 5/2020 | Fuhse | |
| 10,870,305 | B2 | 12/2020 | Fuhse et al. | |
| 2006/0198998 | A1 | 9/2006 | Raksha et al. | |
| 2008/0258456 | A1 | 10/2008 | Rahm et al. | |
| 2010/0045024 | A1 | 2/2010 | Attner et al. | |
| 2012/0319395 | A1* | 12/2012 | Fuhse | B42D 25/369 283/67 |
| 2013/0084411 | A1 | 4/2013 | Raksha et al. | |
| 2013/0093172 | A1 | 4/2013 | Fuhse et al. | |
| 2013/0099474 | A1 | 4/2013 | Fuhse et al. | |
| 2016/0187546 | A1 | 6/2016 | Raksha et al. | |
| 2016/0257159 | A1 | 9/2016 | Attner et al. | |
| 2018/0001690 | A1 | 1/2018 | Fuhse et al. | |
| 2018/0117947 | A1 | 5/2018 | Fuhse | |
| 2020/0086674 | A1 | 3/2020 | Tashiro et al. | |
| 2021/0070088 | A1 | 3/2021 | Fuhse et al. | |

FOREIGN PATENT DOCUMENTS

| | | | |
|---|---|---|---|
| DE | 102010049831 | A1 | 5/2012 |
| DE | 102017006507 | A1 | 1/2019 |
| EP | 3339048 | A1 | 6/2018 |
| JP | 2006293358 | A | 10/2006 |
| WO | 2008095698 | A1 | 8/2008 |
| WO | 2011066990 | A2 | 6/2011 |
| WO | 2016180522 | A1 | 11/2016 |

OTHER PUBLICATIONS

International Search Report from corresponding PCT Application No. PCT/EP2022/025130, Jul. 13, 2022.

* cited by examiner

OPTICALLY VARIABLE SECURITY ELEMENT

TECHNICAL FIELD OF THE INVENTION

The invention relates to an optically variable security element. The invention furthermore relates to a document of value having the optically variable security element.

TECHNICAL BACKGROUND

Optically variable security elements, for example on banknotes, are known from the prior art. A viewer is in this case provided with different optical impressions as a function of a viewing angle. The different viewing angles may be achieved by tilting the optically variable element, or a document of value having the optically variable element, about an axis while the viewing direction of the viewer and the illumination direction of the optically variable element remain unchanged.

WO 2011/066990 A2 relates to a security element having a surface area which is divided into pixels. The pixels comprise at least one optically active facet. The facets of the security element are oriented in such a way that a viewer can perceive the surface area as a surface that projects to the front and/or the rear relative to its actual three-dimensional shape. The perceptible area may be curved.

WO 2016/180522 A1 relates to an optically variable security element having a two-dimensional motif region. The motif region comprises facets which can reflect light of a light source. In this case, a first facet can reflect the light in the direction of a first eye of a viewer and a second facet can reflect the light in the direction of a second eye of the viewer. An offset between the first facet and the second facet is interpreted by the viewer as a point floating below the motif region. Two facets per point are needed for the encoding of an image, so that the production of such a security element is relatively complex.

SUMMARY OF THE INVENTION

It is an object of the invention to provide an optically variable security element which allows improved security against forgery and the authenticity of which can be verified easily by a viewer. It is a further object of the invention to provide an optically variable security element which can be produced relatively simply and economically.

An optically variable security element comprises a motif region. A multiplicity of variously aligned facets are arranged in the motif region. A pattern having visible pattern elements is visible to a viewer in the motif region at least at a first viewing angle. The visible pattern elements are differently configured in order to represent a motif for the viewer. The motif is a three-dimensional motif. The pattern elements are differently configured such that they represent a perspective of the three-dimensional motif for the viewer.

Security elements may be applied onto an object in order to allow verification of the authenticity of the object. Such an object may for example be a check, a bankcard, a document, a certificate, a proof of identity, an item of clothing (a label of an item of clothing) or a banknote.

By a distortion of the pattern elements, a three-dimensional impression may be imparted to the viewer in the pattern. It is in this case not necessary to assign two facets on the security element for one image point, cf. WO 2016/180522 A1. The viewer can assess the authenticity of the security element or the document having the security element easily and with good reliability.

The pattern elements may be perceptible in such a way that the impression is imparted to a viewer that a pattern having pattern elements with identical shapes has been placed around the surface of a three-dimensional object, for example a (hemi) sphere, a cylinder, a face or an apple. The three-dimensional impression may be generated by different shapes of the pattern elements.

A section of the pattern may be three-dimensionally perceptible. The three-dimensionally perceptible section of the pattern may be the motif.

The entire pattern may be three-dimensionally perceptible. The entire pattern may be the motif.

The pattern may be an optically variable pattern.

The pattern elements are arranged in the pattern in such a way that the motif is three-dimensionally perceptible to the viewer in the pattern.

The security element can impart an optical impression to a viewer (a person) without aids, so that the viewer can visually perceive the authenticity of the object provided with the security element without aids. An optical security element is particularly suitable for simple or everyday authenticity verifications by a person. The optical impression may be perceptible in a wavelength range of from 400 nm to 780 nm.

In an optically variable security element, there are different optical impressions for the viewer who wishes to carry out an authenticity verification, as a function of the viewing angle, the viewing direction, the side of the security element or the way in which it is viewed (from the front or through the back). Thus, the security element may impart a first optical impression at least at a first viewing angle and a second optical impression at least at a second viewing angle, the first optical impression and the second optical impression being different.

The security element may be applied onto the object to be protected, for example a banknote or a precursor of a banknote, for example as a patch (sticker) or as a strip. The security element may be formed over an area. The area of the security element may be at most 5000 $mm^2$, preferably at most 2500 $mm^2$, more preferably at most 1500 $mm^2$, more preferably at most 1000 $mm^2$.

The security element may have a length which is at least five times, preferably at least ten times, greater than its width. The security element may have a width of at least 1 mm.

The security element may be provided as a thread, as a strip or as a patch.

A security paper may be a precursor of a document of value. A security paper may be paper which has not yet been fully printed. A security paper may comprise at least one security element, at least one window and/or at least one security feature.

The security element may be applied onto a document of value or a security paper. The security element may extend from one side of the document of value or security paper to another side of the document of value or security paper. The sides may be opposite sides. The security element may have a length which is equal to the width or height of the document of value or security paper.

The security element may be introduced at least partially into the document of value or security paper. The security element may be introduced into the document of value or security paper in such a way that some sections of the security element are visible to a viewer and other sections of the security element are not visible to the viewer. The security element may be introduced into the document of value or security paper in such a way that some sections of the security element are covered by the document of value or security paper and other sections of the security element are not covered by the document of value or security paper.

The pattern with the visible pattern elements may be visible in the motif region. The motif may be visible in sections or fully in the pattern.

The motif region may have an area which is equal to the area of the security element. The area of the motif region may be at most 95%, preferably at most 90%, more preferably at most 75%, more preferably at most 50%, more preferably at most 30%, more preferably at most 20% of the area of the security element.

The area of the motif region may be at least 20%, preferably at least 40%, more preferably at least 60%, more preferably at least 80%, more preferably at least 90% of the area of the security element.

The security element may have a width of at most 500 mm, preferably at most 250 mm, more preferably at most 100 mm, more preferably at most 50 mm.

The security element may have a height of at most 500 mm, preferably at most 250 mm, more preferably at most 100 mm, more preferably at most 80 mm.

The facets may be surfaces of microreflectors. Each surface of a microreflector may be a facet. The microreflectors may be micromirrors. Preferably, the microreflectors are micromirrors respectively having an inclined facet.

The microreflectors, in particular the micromirrors, may be configured as described in DE 10 2005 061 749 A1. The microreflectors, in particular the micromirrors, may be generated or produced as described in DE 10 2005 061 749 A1.

The facets may be directionally reflecting facets. The facets are preferably nondiffractive facets.

Light, particularly in a wavelength range of from 400 nm to 700 nm, may be reflected at the facets. Preferably, the light is reflected at the facets to at least 30%, preferably to at least 50%, more preferably to at least 70%, more preferably to at least 80%, more preferably to at least 90%.

Alternatively, or in addition, the facets may have a refracting effect. This may, for example, be provided in the case of using the security element for viewing through the back.

A refracting effect may be achieved when the facets are present at the interface between two materials with a different refractive index. Preferably, the difference in the refractive index of the two materials is more than 0.1, more preferably more than 0.2, more preferably more than 0.5.

The greater the difference in the refractive index is, the higher the refracting effect is. Such an interface may exist between two different layers inside a layer composite or on the surface of the security element. Particularly when the interface exists on the surface of the security element, one of the materials may be air.

The security element may comprise an arrangement of facets, in particular of microreflectors having the facets. The arrangement of facets may comprise a relief structure having a reflection-increasing coating. The arrangement of facets may comprise a relief structure with a metal coating. The arrangement of facets may comprise an embossed embossing lacquer layer.

A dimension of each of the facets, in particular a maximum width of each of the facets, may lie between 2 μm and 300 μm, preferably between 3 μm and 100 μm, preferably between 5 μm and 50 μm.

The facets may be inclined or tilted in relation to a plane (x-y plane) defined by the security element. In this way, the light of a light source may be reflected with a different strength toward a point by various facets which are inclined differently in relation to the plane. By a suitable selection of the tilting of different facets, a motif may be visible to a viewer by reflection of light. Different optical impressions may especially be visible to the viewer as a function of the viewing angle.

The facets may be provided with a reflective or reflection-increasing coating. A metallic or high refractive index coating may be applied onto the facets. A (color-tilting or color-filtering) multilayer system may be applied onto the facets. The facets may be provided with a liquid-crystal coating.

Facets may for example be formed by an embossing method in an embossable layer, for example in an embossing lacquer layer. The embossable layer may be applied onto a substrate. The embossable layer may be a film, in particular a thermoplastic film. The embossable layer may be a radiation-curable lacquer. The embossable layer may have a plurality of sublayers.

The facets may be overlaid with structures, the dimensions of which are preferentially less than the wavelengths of visible light, preferably equal to or greater than one fourth of the wavelength of visible light. The structures may be referred to as subwavelength structures.

Subwavelength structures may be periodic structures, the period of which lies in the range of from 50 nm to 500 nm, preferably from 100 nm to 400 nm. Subwavelength structures may be aperiodic structures, the structure width of which lies in the range of from 50 nm to 500 nm, preferably from 100 nm to 400 nm. In this way, a motif may be represented in color, in particular multiple colors. The colored representation may be independently adjustable or selectable for each of the facets. In particular, a color change may be achievable as a viewing angle-dependent color effect. A viewing angle-dependent color effect may be combined with a kinematic effect, in particular with a kinematic effect as described herein.

The pattern in the motif region may be a regular or irregular pattern. In particular, the pattern is a regular pattern.

Pattern elements of the pattern may be elements that recur in the pattern. A pattern may comprise a multiplicity of pattern elements. The pattern may comprise at least 9, preferably at least 20, more preferably at least 30, more preferably at least 50 pattern elements.

The pattern elements may have a contour. The contour may be an outer contour. The pattern element may be (optically) delimited from its surroundings by the contour. The contour may enclose an inner section of the pattern element.

The motif in the pattern may be perceptible to the viewer by precisely one eye of the viewer. The motif in the pattern may likewise be perceptible to the viewer by two eyes of the viewer. The motif in the pattern may be perceptible to the viewer both by precisely one eye and by two eyes of the viewer. The three-dimensional impression of the motif may be perceptible to the viewer by the shapes of the pattern elements.

A first pattern element (or one of the pattern elements) may be visible distorted in relation to a second pattern element (or another of the pattern elements).

The visible pattern elements may comprise perspectively distorted pattern elements. The perspectively distorted pattern elements may be visible to the viewer in the motif.

Alternatively, or in addition, visible pattern elements may comprise undistorted pattern elements. The undistorted pattern elements may be visible to the viewer outside the motif.

The pattern elements may be distorted in such a way that the pattern elements are perceptible as converging at a common vanishing point.

A first pattern element of the pattern elements may be perspectively distorted differently in relation to a second pattern element of the pattern elements.

At least 3, preferably at least 5, more preferably at least 7, more preferably at least 10, of the pattern elements may be distorted in relation to one of the pattern elements.

A distortion may be a deformation, an elongation and/or a shearing. An elongation may be a stretching or a compression.

A first pattern element may have a larger area than a second pattern element.

A first pattern element may have a smaller area than a second pattern element. An area of a pattern element may be an area enclosed by a contour of the pattern element.

The contour of the first pattern element may be perceptible differently to the contour of the second pattern element.

The pattern elements may be submotifs. The pattern elements may themselves be motifs. The submotif may have a submotif shape that is perceptible to the viewer. A submotif shape is for example a circle, a quadrilateral or an apple. In particular, the submotif is a polygon, a rectangle or a triangle.

The submotif may have a contour. The contour may be an outer contour. The submotif may be (optically) delimited from its surroundings by the contour. The contour may enclose an inner section of the submotif.

Submotifs having the same submotif shape may be visible in the pattern. In particular, at least 5, preferably at least 10, more preferably at least 15, more preferably at least 20, submotifs having the same submotif shape may be visible in the pattern.

Submotifs having identical submotif shapes may be alignable. In particular, submotifs having identical submotif shapes may be alignable without modifying the submotifs, for example without enlargement or without centric stretching.

Two submotifs having mutually corresponding shapes may be alignable by enlargement or by centric stretching of one of the submotifs.

For example, the submotif shape of a first submotif (first pattern element) and the submotif shape of a second submotif (second pattern element) may respectively be a square. The side lengths of the square first submotif may be smaller than the side lengths of the square second submotif. The first submotif and the second submotif may be aligned by enlargement or centric stretching.

In general, alignment of two motifs may take place if the areas of the motifs, for example the areas of the motifs which are enclosed by the respective contour of the motif, can be aligned to at least 80%, preferably to at least 85%, more preferably to at least 90%, more preferably to at least 92%, more preferably to at least 94%, more preferably to at least 96%, more preferably to at least 98%, more preferably to at least 99%, more preferably to at least 99.5%, more preferably to at least 99.8%, preferably fully.

The pattern elements may be lines (line pattern elements). The pattern elements may be L-shaped. The pattern elements may be cruciform. The pattern elements may be V-shaped. The pattern elements may be in the form of strips.

A line pattern element may have no area. A line pattern element may have no contour.

The pattern elements may be area pattern elements. An area pattern element may be visible continuously brightly or continuously darkly to the viewer. The pattern elements may be full-area pattern elements.

The pattern elements may be area contour pattern elements.

The area contour pattern elements may respectively have a contour, which respectively encloses an inner section of the respective pattern element. The contour may be brightly visible to the viewer and the inner section of the pattern element may be darkly visible to the viewer. The contour may be darkly visible to the viewer and the inner section of the pattern element may be brightly visible to the viewer, in particular if the surroundings of the contour are brightly visible to the viewer.

The area contour pattern elements may respectively have a frame, which respectively encloses an inner section of the respective pattern element. The frame may be brightly visible to the viewer and the inner section of the pattern element may be darkly visible to the viewer. The frame may be darkly visible to the viewer and the inner section of the pattern element may be brightly visible to the viewer. A frame may have a greater width than a contour, in particular if the surroundings of the contour are brightly visible to the viewer.

The visible pattern elements may be independent pattern elements. Independent pattern elements cannot overlap. Independent pattern elements may be spaced apart from one another.

The visible pattern elements may be connected pattern elements. Connected pattern elements may overlap. Independent pattern elements cannot be spaced apart from one another.

By tilting the optically variable security element about an axis which lies in a plane of the security element, a kinematic effect may be perceptible to the viewer in the pattern. Preferentially, the kinematic effect is a movement of at least one, in particular some or all, of the pattern elements or a movement of the three-dimensional motif, or a movement of an additional independent motif in the motif region. The additional motif is not predetermined by the three-dimensional motif, and for example is not dependent on its three-dimensionality and/or motif shape, but is an independent motif. By movement of the pattern element/elements, the three-dimensional motif or the additional motif, in particular the shape, size, position and/or orientation (rotation) thereof, will change.

The kinematic effect may be a movement of at least one, in particular some or all, of the pattern elements. The pattern elements may change their shape, their size, their position, their area and/or their orientation (rotation) during the kinematic effect. Particularly preferably, the position of the pattern elements is static, the size of the (fixed/static) pattern elements more preferentially changing. The kinematic effect may be a movement of all pattern elements in the motif. The kinematic effect may be a movement of all pattern elements that are distorted.

The position of the motif may not change during a movement of pattern elements. The position of the motif may remain the same during a movement of pattern elements.

The movement of the pattern elements may (as a function of the viewing angle) be visible to the viewer over at most 30%, preferably over at most 25%, more preferably over at most 20%, more preferably over at most 15%, more preferably over at most 10%, more preferably over at most 5% of a height or width of the pattern.

The movement of the pattern elements may (as a function of the viewing angle) be visible to the viewer over at most 30%, preferably over at most 25%, more preferably over at most 20%, more preferably over at most 15%, more preferably over at most 10%, more preferably over at most 5% of a height or width of the motif region.

The kinematic effect may be a movement of an additional, preferentially independent, motif in the motif region.

The kinematic effect may (as a function of the viewing angle) be visible to the viewer over at least 10%, preferably over at least 20%, more preferably over at least 30%, more preferably over at least 40%, more preferably over at least 50%, more preferably over at least 60%, more preferably over at least 70%, more preferably over at least 80%, more preferably over at least 90% of a height or width of the pattern.

Over the height or width of the pattern, the kinematic effect may be perceptible as running or moving continuously.

The kinematic effect may (as a function of the viewing angle) be visible to the viewer over at least 10%, preferably over at least 20%, more preferably over at least 30%, more preferably over at least 40%, more preferably over at least 50%, more preferably over at least 60%, more preferably over at least 70%, more preferably over at least 80%, more preferably over at least 90% of a height or width of the motif region.

Over the height or width of the motif region, the kinematic effect may be perceptible as running or continuous. The kinematic effect may be a motion effect. The kinematic effect may be perceptible to the viewer as a continuous movement. The movement takes place in particular quasi-continuously (in sufficiently small substeps). During the tilting, the substeps of the movement in one direction are preferably at least less than an (average or local) size (or extent) of a pattern element in the direction, more preferentially less than 40%, more preferably less than 25% of the size.

The kinematic effect may be a pump effect. A movement, in particular a size change and/or shape change, may be represented as pumping if the movement, such as a size or shape change, takes place in reverse with continued tilting (same tilting direction), that is to say for example a reverse size and/or shape change. The pattern elements(s), the three-dimensional motif or the additional motif returns to its initial size and/or shape after the size or shape changes during the tilting.

The position of the motif may be altered by the kinematic effect. The shape of the motif may be altered by the kinematic effect.

At a second viewing angle, which is different than the first viewing angle, the position of the motif may be altered in comparison with the position of the motif at the first viewing angle.

At a second viewing angle, which is different than the first viewing angle, the shape of the motif may be altered in comparison with the shape of the motif at the first viewing angle.

At a second viewing angle, which is different than the first viewing angle, the optical impression of the motif may be altered in comparison with the optical impression of the motif at the first viewing angle.

At a second viewing angle, which is different than the first viewing angle, the shapes of the pattern elements may be altered in comparison with the shapes of the pattern elements at the first viewing angle. In particular, all or a fraction of the pattern elements may have become larger or smaller.

It is also conceivable, and often advantageous because it is particularly conspicuous, for one fraction of the pattern elements to become larger and for another fraction of the pattern elements to become smaller. Neighboring pattern elements may advantageously become alternately larger and smaller, respectively.

The first viewing angle and the second viewing angle may be different viewing angles. The first and second viewing angles may differ by at most 40°, preferably by at most 30°, more preferably by at most 20°, more preferably by at most 10°.

A transition from the first viewing angle to the second viewing angle may be performable by tilting the security element about an axis which lies in a plane of the security element.

A continuous movement may be perceptible by continuous tilting of the security element. The movement of the pattern element/three-dimensional motif/additional motif takes place quasi-continuously, that is to say particularly in such small substeps that the substeps are no longer perceptible as a discrete change to the viewer. By continuous tilting of the security element, the position of the motif may be perceptible as continuously varying. By continuous tilting of the security element, the shape of the motif may be perceptible as continuously varying. By continuous tilting of the security element, the optical impression of the motif may be perceptible as continuously varying. By continuous tilting of the security element, the shapes of pattern elements may be perceptible as continuously varying, in particular decreasing or increasing.

The kinematic effect may be perceptible to the viewer by a variation of contours and/or shapes of pattern elements.

The kinematic effect may be perceptible to the viewer by a variation of at least 10%, preferably at least 20%, more preferably at least 30%, more preferably at least 40%, more preferably at least 50%, more preferably at least 60%, more preferably at least 70%, more preferably at least 80%, more preferably at least 90%, of the contours and/or shapes of the pattern elements.

The kinematic effect may be perceptible to the viewer by a variation of positions of pattern elements.

The kinematic effect may be perceptible to the viewer by a variation of at least 10%, preferably at least 20%, more preferably at least 30%, more preferably at least 40%, more preferably at least 50%, more preferably at least 60%, more preferably at least 70%, more preferably at least 80%, more preferably at least 90%, of the positions of the pattern elements.

The contours and/or shapes of pattern elements may be perceptible to the viewer as a function of the tilting of the optically variable security element about the axis.

The positions of pattern elements may be perceptible to the viewer as a function of the tilting of the optically variable security element about the axis.

The kinematic effect may be perceptible to the viewer by a variation of sizes of pattern elements.

The kinematic effect may be perceptible to the viewer by a variation of a position of the additional motif. Preferably, the kinematic effect is perceptible to the viewer by a variation of a position of a brightly acting section. The brightly acting section may be a coherent or continuous section. The brightly acting section may comprise at least two, preferably a plurality of brightly acting sections. The brightly acting sections may be spaced apart from one another.

The kinematic effect may be a movement of an additional motif. In particular, the kinematic effect is a movement of an additional motif having a geometrical motif shape. The additional motif may comprise a brightly acting section or may be a brightly acting section.

In the security element or in the pattern, a first kinematic effect and a second kinematic effect may be perceptible to the viewer. The first kinematic effect and the second kinematic effect may be different kinematic effects.

A first kinematic effect may be perceptible to the viewer in the pattern by tilting the optically variable security element about a first axis, which lies in a plane of the security element. A second kinematic effect may be perceptible to the viewer in the pattern by tilting the optically variable security element about a second axis, which lies in a plane of the security element. The second axis may be nonparallel to the first axis. An angle (greater than 0) may be formed between the second axis and the first axis. The first axis may be oriented substantially (+10%) perpendicularly to the second axis.

The first kinematic effect may be a movement of the pattern element(s). The first kinematic effect may be a movement of the three-dimensional motif.

The second kinematic effect may be a movement of an additional, in particular independent, motif. Preferably, the second kinematic effect is a movement of a brightly acting section, in particular having an independent additional motif shape and/or width. Alternatively, the second kinematic effect is a movement of the three-dimensional motif, or of the pattern element(s).

Each of the facets may define a normal vector having a first orientation component and a second orientation component.

A normal vector may be oriented or defined orthogonally to the respective facet.

The facets may be tilted in relation to an x-y plane defined by the security element. Various facets may be tilted differently in relation to an x-y plane defined by the security element. Normal vectors of differently tilted facets may differ from one another by the first and/or second orientation component.

The second orientation component of the normal vectors of the facets may have no influence on the (first) kinematic effect.

The (first) kinematic effect may be established independently of the second orientation components of the normal vectors of the facets.

In the motif region or the security element, an additional motif may be perceptible to the viewer. The additional motif may be perceptible as a brightly acting section.

A brightly perceptible section exhibits a higher relative reflected light intensity in the direction of the viewer than a darkly perceptible section at the given viewing angle under nondiffuse illumination, for example by the sun or a point light source.

The relative reflected light intensity is a ratio of reflected light intensity to incident light intensity. If the light of a light source is fully reflected, the relative reflected light intensity is 100%.

In a brightly perceptible section, the relative reflected light intensity may be at least 5%, preferably at least 10%, more preferably at least 20%, more preferably at least 30%, more preferably at least 40%, more preferably at least 50% greater than the relative reflected light intensity in a darkly perceptible section. The percentages indicated may be percentage points. In the dark sections, less light can be reflected overall or the facets reflect the light in another direction, which is not directed toward the viewer.

The additional motif may extend over an area of at least 2%, preferably at least 4%, more preferably at least 6%, more preferably at least 8%, more preferably at least 10%, more preferably at least 12%, more preferably at least 14%, more preferably at least 16%, more preferably at least 18%, more preferably at least 20%, more preferably at least 22%, more preferably at least 24%, more preferably at least 26%, more preferably at least 28%, more preferably at least 30%, of the total area of the pattern.

The additional motif may extend over an area of at least 2%, preferably at least 4%, more preferably at least 6%, more preferably at least 8%, more preferably at least 10%, more preferably at least 12%, more preferably at least 14%, more preferably at least 16%, more preferably at least 18%, more preferably at least 20%, more preferably at least 22%, more preferably at least 24%, more preferably at least 26%, more preferably at least 28%, more preferably at least 30%, of the total area of the motif region.

Sections which do not have a white effect may be visible in the additional motif, in particular if the additional motif is a brightly acting section.

The additional motif may be visible in the form of a strip. The additional motif may be perceptible in the form of a strip and extend from one side of the pattern to another side of the pattern, in particular to an opposite side of the pattern.

The additional motif may comprise a plurality of brightly acting sections, which reflect incident light toward the viewer and are consequently perceptible to the viewer.

The additional motif may be perceptible as running or moving over the three-dimensional motif.

The position of the additional motif may be perceptible to the viewer as a function of the tilting of the optically variable security element about an axis, in particular about the second axis.

The additional motif, in particular the position of the additional motif, may be established by the second orientation components of the normal vectors of the facets.

The first orientation components of the normal vectors of the facets may have no influence on the additional motif, in particular the position of the additional motif.

The additional motif, in particular the position of the additional motif, may be established independently of the first orientation components of the normal vectors of the facets.

The motif may be perceptible in the pattern as a nonplanar surface of the pattern.

The motif may be perceptible in the pattern as a curved surface of the pattern.

The pattern elements may, at least in sections, preferably fully, be perceptible to the viewer in a regular grid.

The pattern elements may, at least in sections, preferably fully, be perceptible to the viewer in an irregular grid.

Contours of the pattern elements may have rectilinear sections. Contours of the pattern elements may have curved sections. Contours of the pattern elements may have arcuate sections.

Sections of the contours of the pattern elements may be perceptible as parallel to one another. Sections of the contours of the pattern elements may be perceptible as nonparallel to one another.

At least one of the pattern elements, preferably all pattern elements, may have a closed contour.

At least one of the pattern elements, preferably at most 50% of the pattern elements, may have an interrupted contour.

At least one of the pattern elements, preferably all pattern elements, may the fully visible in the motif region.

At least one of the pattern elements, preferably at most 50% of the pattern elements, may be visible as interrupted or truncated in the motif region.

The pattern may change abruptly in a section, preferably along a line.

Contours of the pattern elements may be visible as a brightly acting line.

Contours of the pattern elements may be visible as a darkly acting line.

An optically variable security element may comprise a motif region, in which case a pattern having visible pattern elements may be visible to a viewer in the motif region at least at a first viewing angle. At least in a section of the pattern, a three-dimensional impression may be perceptible to the viewer. A first kinematic effect may be perceptible to the viewer in the pattern by tilting the optically variable security element about a first axis.

The three-dimensional impression may be perceptible to the viewer in the section of the pattern by precisely one eye of the viewer. The three-dimensional impression may likewise be perceptible to the viewer by two eyes of the viewer. The three-dimensional impression may be perceptible to the viewer both by precisely one eye and by two eyes of the viewer. The three-dimensional impression of the motif may be perceptible to the viewer by the shapes of the pattern elements and/or the arrangement thereof.

The first kinematic effect may be a movement of pattern elements.

The pattern elements may respectively have a contour. The contour of at least one first pattern element may be different than the contour of at least one second pattern element.

The contours and/or shapes of the pattern elements may be configured in such a way that the three-dimensional impression of the pattern is perceptible to the viewer at least in the section of the pattern.

The pattern elements may be arranged in the pattern in such a way that the three-dimensional impression of the pattern is perceptible to the viewer at least in the section of the pattern.

The first pattern element may be visible distorted in relation to the second pattern element. The pattern elements may be submotifs.

The first kinematic effect may be perceptible to the viewer by a variation of contours and/or shapes of pattern elements.

The contours and/or shapes of pattern elements may be perceptible to the viewer as a function of the tilting of the optically variable security element about the first axis.

The optically variable security element may comprise a multiplicity of facets.

The facets may be aligned differently.

The optically variable security element may comprise micromirrors. A surface of a respective micromirror may be a facet.

A normal vector having a first orientation component and a second orientation component may be defined by the facets. A normal vector may respectively be defined by respectively one facet.

The facets may be tilted in relation to an x-y plane defined by the optically variable security element. The first kinematic effect may be established by the first orientation components of the normal vectors of the facets.

A second kinematic effect may be perceptible to the viewer in the pattern by tilting the optically variable security element about a second axis.

The second kinematic effect may be perceptible to the viewer over at least 10% of the height or width of the pattern.

The second kinematic effect may be perceptible to the viewer by a variation of a position of an additional motif, in particular of a brightly acting section of the pattern.

The position of the additional motif may be perceptible to the viewer as a function of the tilting of the optically variable security element about the second axis.

The facets may be tilted in relation to an x-y plane defined by the optically variable security element. The second kinematic effect may be established by the second orientation components of the normal vectors of the facets.

A document of value may comprise each of the security elements disclosed herein. The document of value may be a check, a bankcard, a document, a certificate, a proof of identity, an item of clothing (a label of an item of clothing) or a banknote.

The document of value may comprise at least one further security element. The further security element may be a security element perceptible to a viewer. The further security element may be a security element not perceptible to a viewer. The further security element may be a security element perceptible to a machine.

The document of value may comprise at least one security feature. The security feature may be printed onto the document of value. The security feature may be incorporated into a substrate of the document of value. The security feature may be a security feature perceptible to a viewer. The security feature may be a security feature not perceptible to a viewer. The security feature may be a security feature perceptible to a machine.

BRIEF DESCRIPTION OF THE FIGURES

The invention, and further embodiments and advantages of the invention, will be explained in more detail below with the aid of figures, the figures merely describing exemplary embodiments of the invention. Components which are the same in the figures are provided with the same reference signs. The figures are not to be regarded as true to scale, and individual elements in the figures may be represented exaggeratedly large or exaggeratedly simplified.

DETAILED DESCRIPTION OF VARIOUS EMBODIMENTS

Figure 1:
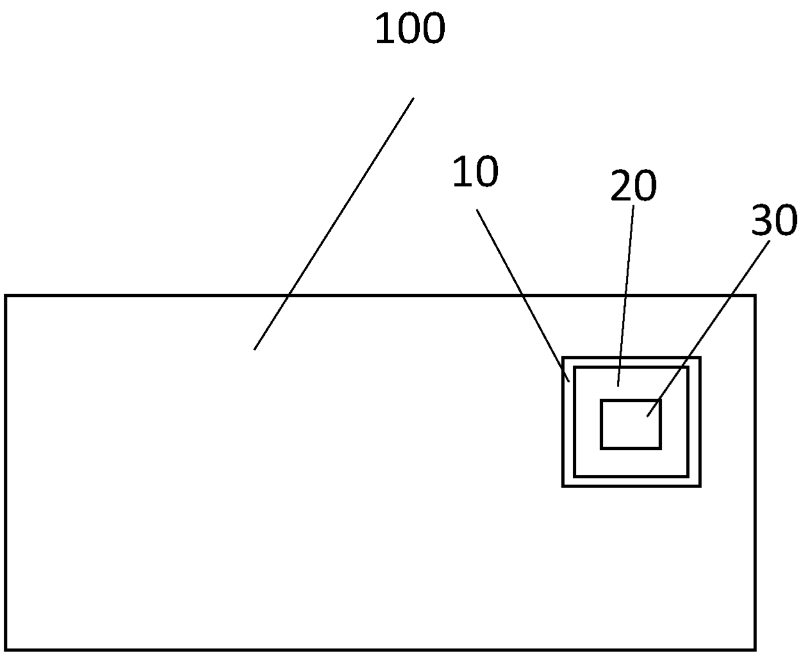
FIG. 1 shows a document of value 100 having a security element 10 and a pattern 30 in a motif region 20.

FIG. 1 shows a document of value 100 having a security element 10. The security element 10 comprises at least one motif region 20. In the motif region 20, a pattern 30 may be visible to a viewer.

The document of value 100 may for example be a banknote. A carrier or substrate of the document of value 100 may comprise or consist of one or more paper layers. The carrier or substrate of the document of value 100 may alternatively comprise or consist of one or more plastic layers. As a further alternative, the carrier or substrate of the document of value 100 may comprise at least one paper layer and at least one plastic layer.

The security element 10 may be applied onto the carrier (or substrate) of the document of value 100, for example as a security strip or security patch. In general, the security elements are provided on a transfer carrier, for example a plastic film, and then transferred from the transfer carrier (separated therefrom) onto the carrier of the document of value. Alternatively, the security element is introduced into the carrier of the document of value, for example as a security thread. The security element may in particular already be introduced into the carrier during the production of the carrier, for example even during the paper or film production or between two sublayers of the carrier.

Figure 2:
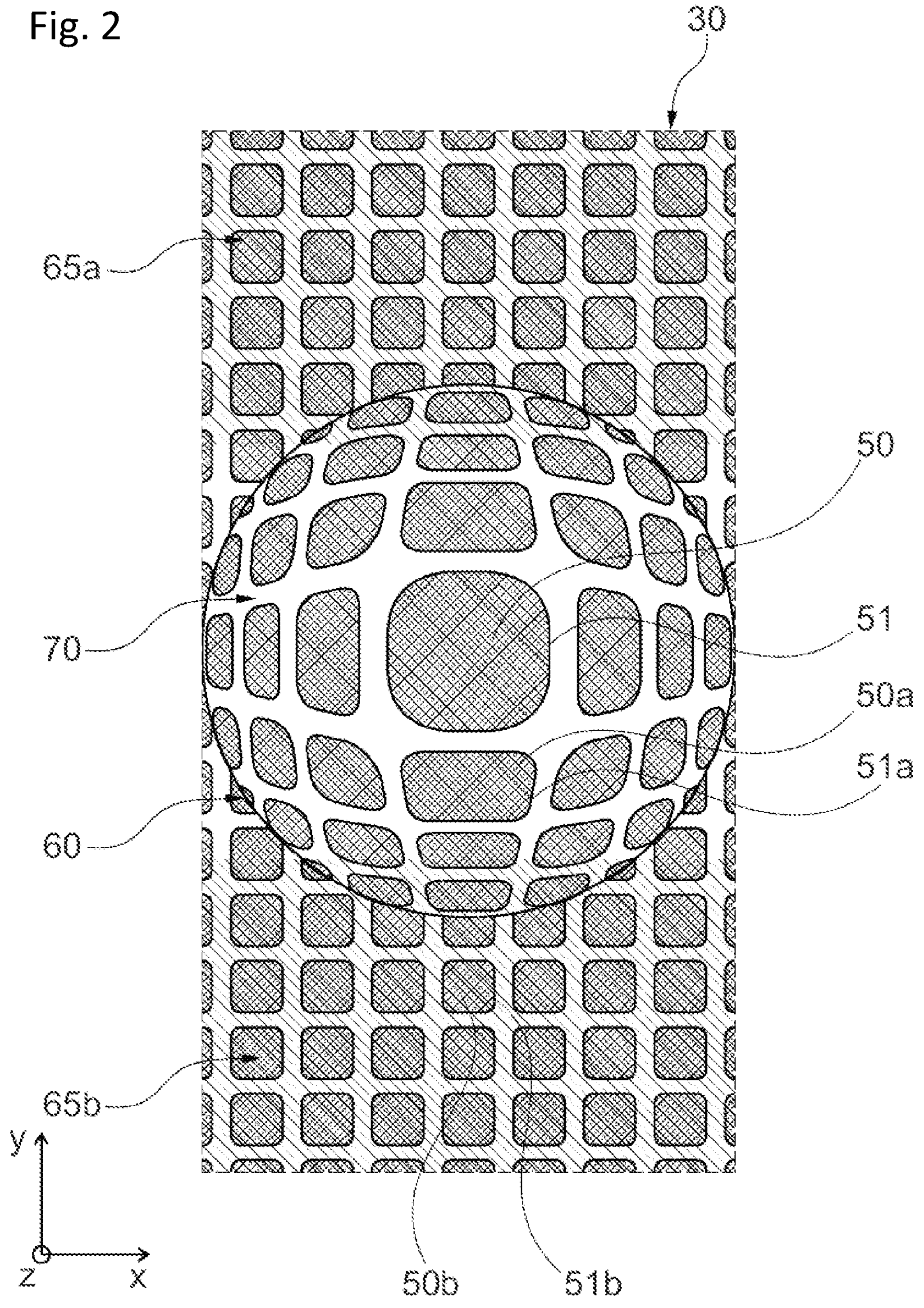
FIG. 2 shows a pattern 30.

FIG. 2 shows a pattern 30. The pattern 30 is visible (perceptible) to a viewer in a motif region 20 of a security element 10 at a first viewing angle.

A multiplicity of pattern elements 50 are visible in the pattern 30. In what follows, pattern elements will generally be summarized by the reference sign 50. Specific pattern elements 50 may be denoted by the reference signs 50, 50*a* and 50*b*.

In a first section 65*a*, pattern elements 50 may be arranged regularly in a grid. Contours 51 and/or shapes of pattern elements 50 in the first section may be identical to one another. Pattern elements 50 in the first section may be undistorted.

In a second section 65*b*, pattern elements 50 may be arranged regularly in a grid. Contours 51 and/or shapes of pattern elements 50 in the first section may be identical to one another. Pattern elements 50 in the first section may be undistorted.

A contour 51 of a pattern element 50 may establish the shape of the pattern element 50. The contour 51 of a pattern element 50 may be enclosed in an inner section of the pattern element 50. A pattern element 50 may also have a shape without the pattern element having a contour.

In general, the pattern elements 50 may be lines. Alternatively, the pattern elements 50 may be area pattern elements 50 or area contour pattern elements 50.

In the example of FIG. 2, the pattern elements 50 are represented as hatched areas in order to highlight the technical representation of the pattern elements 50. Such hatching is generally not visible to the viewer. This is likewise the case for the representations of FIGS. 9 and 13.

A motif 60 is visible to the viewer in the pattern 30. The motif 60 has a three-dimensional effect for the viewer.

In the example of FIG. 2, the motif 60 acts as a section of a spherical surface, for example a hemisphere. In particular, the impression that a regular arrangement of pattern elements 50 has been placed over a three-dimensional object, for example a sphere, is imparted to the viewer.

The three-dimensional impression of the motif 60 for the viewer may be caused by a distortion of pattern elements 50 in the region of the motif 60. In particular, the three-dimensional impression of the motif 60 for the viewer may be caused by a distortion of contours 51 and/or shapes of pattern elements 50 in the region of the motif 60.

The contours 51 of pattern elements 50 in the region of the motif 60 may be deformed or distorted in relation to contours 51 of pattern elements 50 outside the motif 60. In particular, the contours 51 of pattern elements 50 in the region of the motif 60 may be compressed, stretched or sheared in relation to contours 51 of pattern elements 50 outside the motif 60.

The shapes of pattern elements 50 in the region of the motif 60 may be deformed or distorted in relation to shapes of pattern elements 50 outside the motif 60. In particular, the shapes of pattern elements 50 in the region of the motif 60 may be compressed, stretched or sheared in relation to shapes of pattern elements 50 outside the motif 60.

At a first viewing angle, the motif 60 is perceptible to the viewer at a first position. At a second viewing angle, the motif 60 is perceptible to the viewer at a second position. At a third viewing angle, the motif 60 is perceptible to the viewer at a third position.

The first, second and third positions may be different positions. The first, second and third positions may lie along a (straight) line.

Likewise, the position of the motif 60 at the first, second and third viewing angles may be identical or not vary.

The first, second and third viewing angles may be different viewing angles. The first, second and third viewing angles may be achieved by tilting the security element 10 about a first axis. A light source and the viewer may have an unchanged position during the tilting of the security element. For example, the position of the motif 60 may not vary or the position of the motif 60 may remain the same during tilting of the security element about the first axis.

A first kinematic effect, for example a motion effect, may be perceptible to the viewer in the pattern by the tilting about the first axis. The impression that the motif 60 runs through the pattern 30 may be imparted to the viewer. Alternatively, the impression that the pattern elements 50 move in the pattern 30, in particular that the sizes of pattern elements 50 (the respective size of the respective pattern element 50) are varying, may be imparted to the viewer.

The security element 10 may define an x-y plane. The x-y plane may define an x axis and a y axis. The x axis may be nonparallel to the y axis. In particular, the x axis is perpendicular to the y axis. The x-y plane may define a z axis. The z axis may be nonparallel to the x-y plane. The z axis may be oriented perpendicularly to the x-y plane.

The tilting of the security element 10 for the first kinematic effect may take place about the y axis. An example of a first kinematic effect will be explained in more detail with reference to FIGS. 3 and 4.

The motif 60 may be perceived by the viewer in such a way that the motif 60 extends in the direction of the z axis. The motif 60 may be perceived by the viewer in such a way that the motif 60 extends in front of or behind the x-y plane, or curves into this plane or curves out of the plane. The motif 60 may be perceived by the viewer as a curved surface. The motif 60 may be perceived by the viewer as a nonplanar surface.

An additional motif 70 may be perceptible to the viewer, for example as a brightly acting section, in the pattern 30. The additional motif 70 may extend from one side of the pattern 30 to another side of the pattern 30.

In the additional motif 70, the pattern 30, in particular pattern elements 50 of the pattern 30, may have a brighter effect than outside the brightly acting section 70.

At a first viewing angle, the additional motif 70 may be perceptible to the viewer at a first position. At a second viewing angle, the additional motif 70 may be perceptible to the viewer at a second position. At a third viewing angle, the additional motif 70 may be perceptible to the viewer at a third position.

The first, second and third positions may be different positions. The first, second and third positions may lie along a (straight) line.

The first, second and third viewing angles may be different viewing angles. The first, second and third viewing angles may be achieved by tilting the security element 10 about a second axis. A light source and the viewer may have an unchanged position during the tilting of the security element.

A second kinematic effect, for example a motion effect, may be perceptible to the viewer in the pattern by the tilting about the second axis. The impression that the additional motif 70, in particular the brightly acting section, runs or rolls through the pattern 30 may be imparted to the viewer.

The tilting of the security element 10 for the second kinematic effect may take place about the x axis. An example of a second kinematic effect will be explained in more detail with reference to FIGS. 3 and 4.

Figure 3:
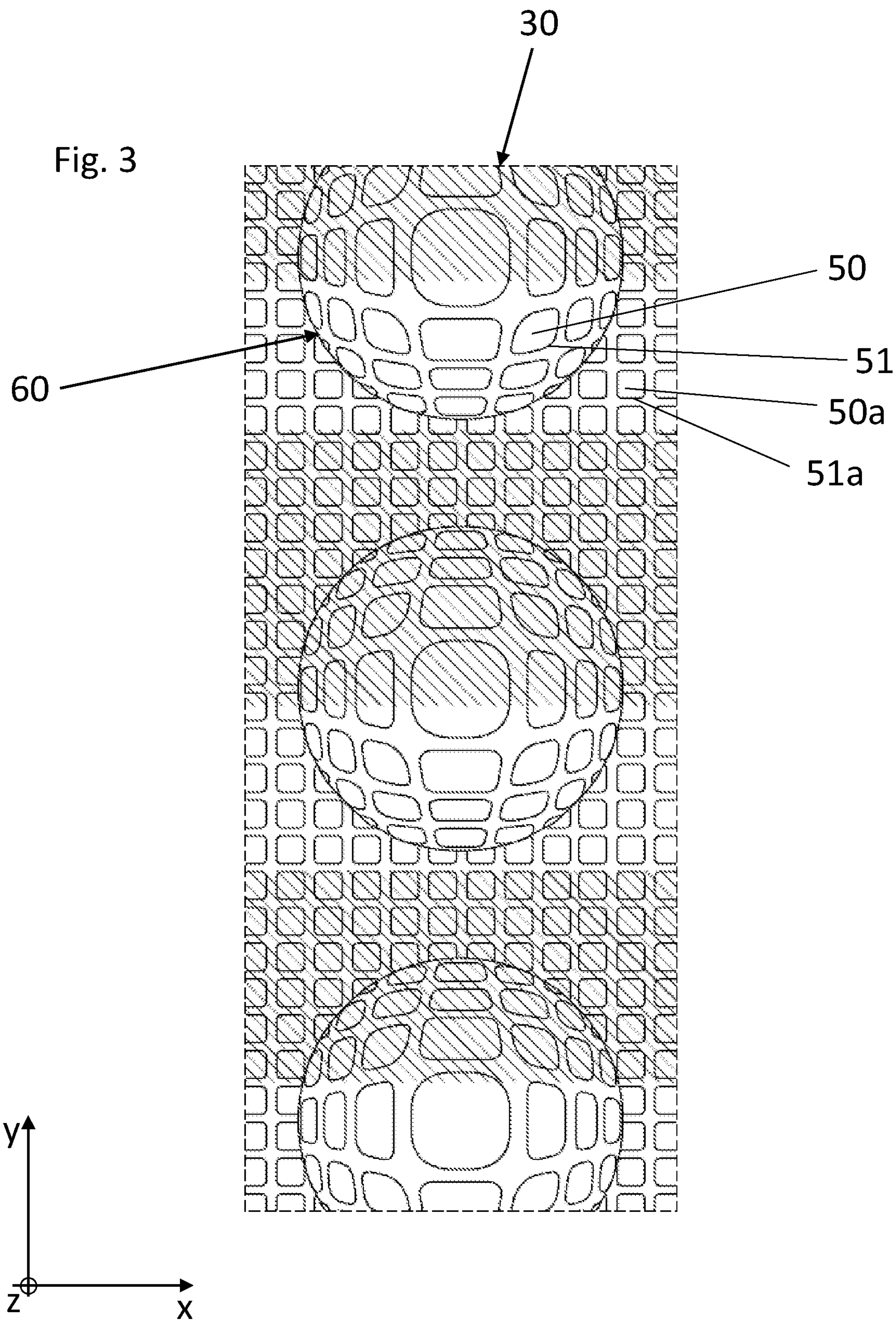
FIG. 3 shows a pattern 30 at a first viewing angle.
Figure 4:
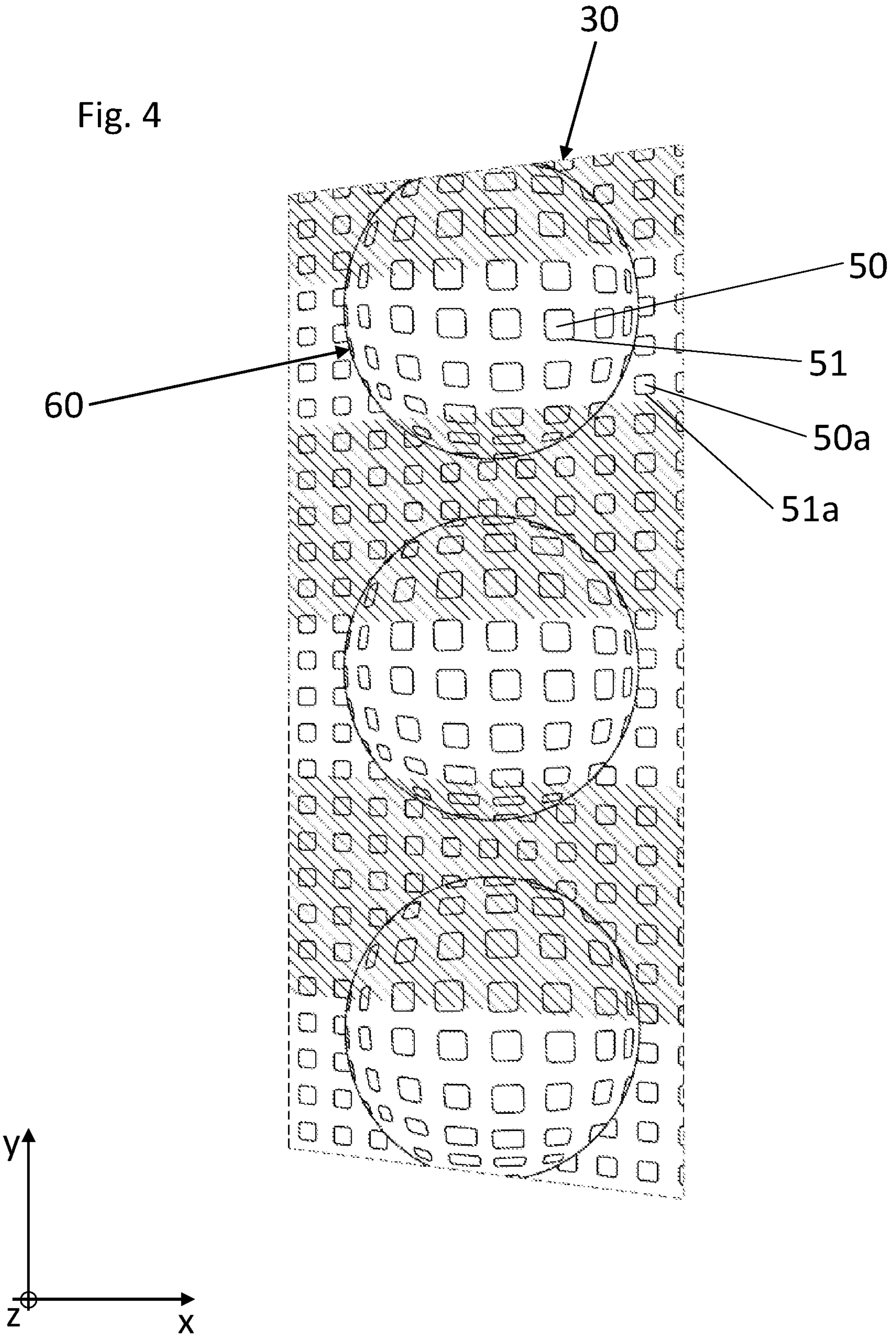
FIG. 4 shows the pattern 30 at a second viewing angle.

FIGS. 3 and 4 show an example of a (first) kinematic effect. A pattern 30 which may correspond substantially to the pattern 30 of FIG. 2 is shown in FIGS. 3 and 4. In this case, FIG. 3 shows the pattern at a first viewing angle and FIG. 4 shows the pattern at a second viewing angle. A transition from the first viewing angle to the second viewing angle may be achieved by tilting the security element 10 having the pattern 30 about a first axis, for example about the y axis.

The pattern elements 50 as shown in FIGS. 3, 4, 5 and 6 are visible to the viewer with a dark contour 51, which surrounds a bright inner section. Preferably, the pattern elements 50 are visible to the viewer with a bright contour 51. An inner section enclosed by the contour 51 may be visible darkly to the viewer.

By tilting the security element 10 about the first axis, a size or shape of the pattern elements 50, 50*a* in the pattern 30 is altered. By tilting the security element 10, the size of pattern elements 50, 50*a* may increase or decrease. Preferably, the size of pattern elements 50, 50*a* increases by tilting in one direction and decreases by tilting in another direction, for example the opposite direction.

The size or shape of pattern elements may vary in the region of the motif 60 by the tilting about the first axis. The size or shape of pattern elements may vary in a region outside the motif 60 by the tilting about the first axis. The size or shape of pattern elements may vary both in the region of the motif 60 and in a region outside the motif 60 by the tilting about the first axis.

By an enlargement of pattern elements 50, 50*a*, a spacing between neighboring pattern elements may decrease. By a reduction of pattern elements 50, 50*a*, a spacing between neighboring pattern elements may increase.

The contours 51, 51*a* of pattern elements 50, 50*a* in the pattern 30 may also vary by tilting the security element 10 about the first axis. The areas surrounded by the contours 51, 51*a* may increase or decrease by tilting of the security element 10. Preferably, the areas surrounded by the contours 51, 51*a* become larger by tilting in one direction and smaller by tilting in another direction, for example the opposite direction.

The pattern 30 may comprise at least two, preferably a plurality of, motifs 60.

Figure 5:
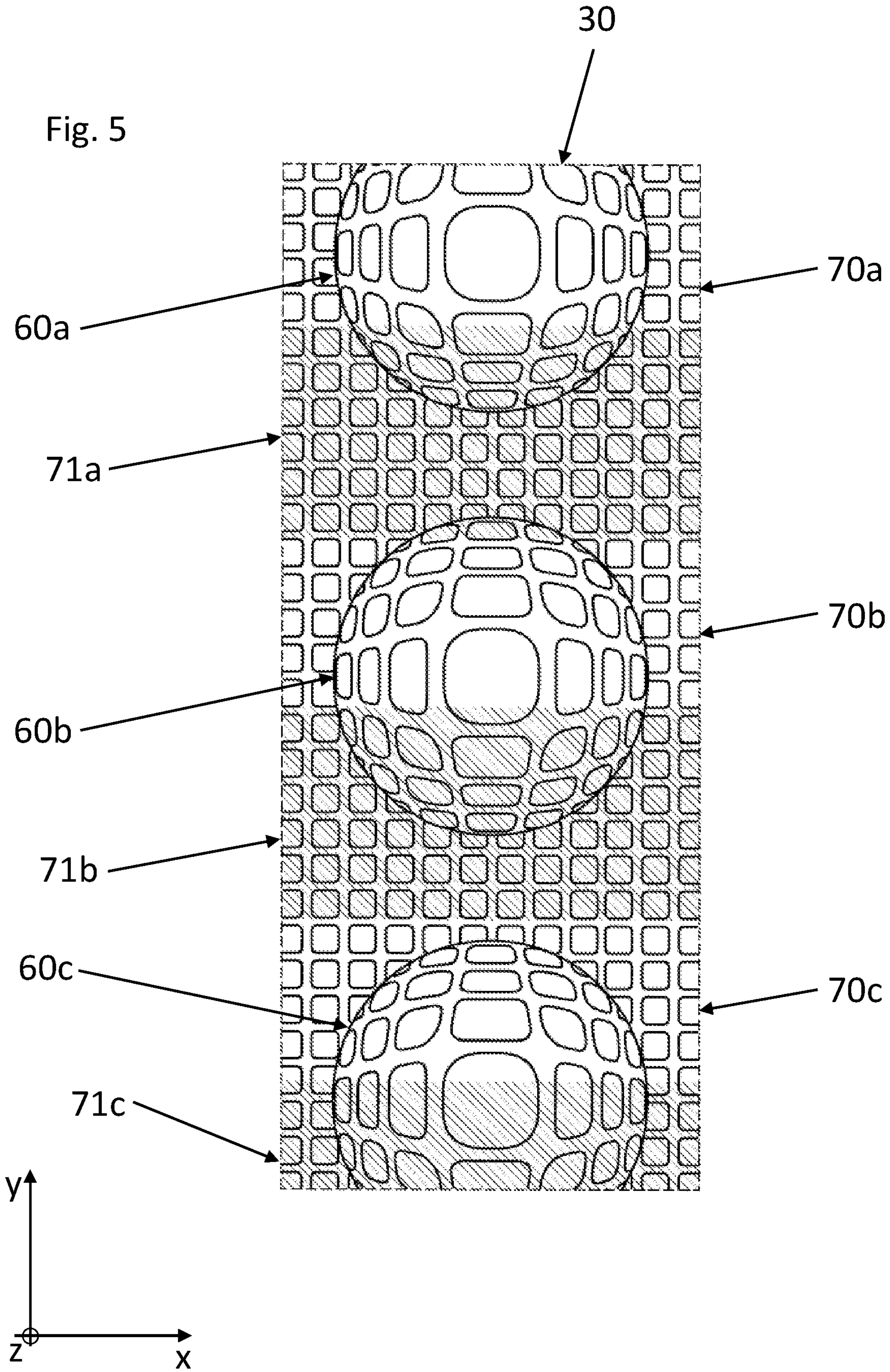
FIG. 5 shows the pattern 30 at a third viewing angle.
Figure 6:
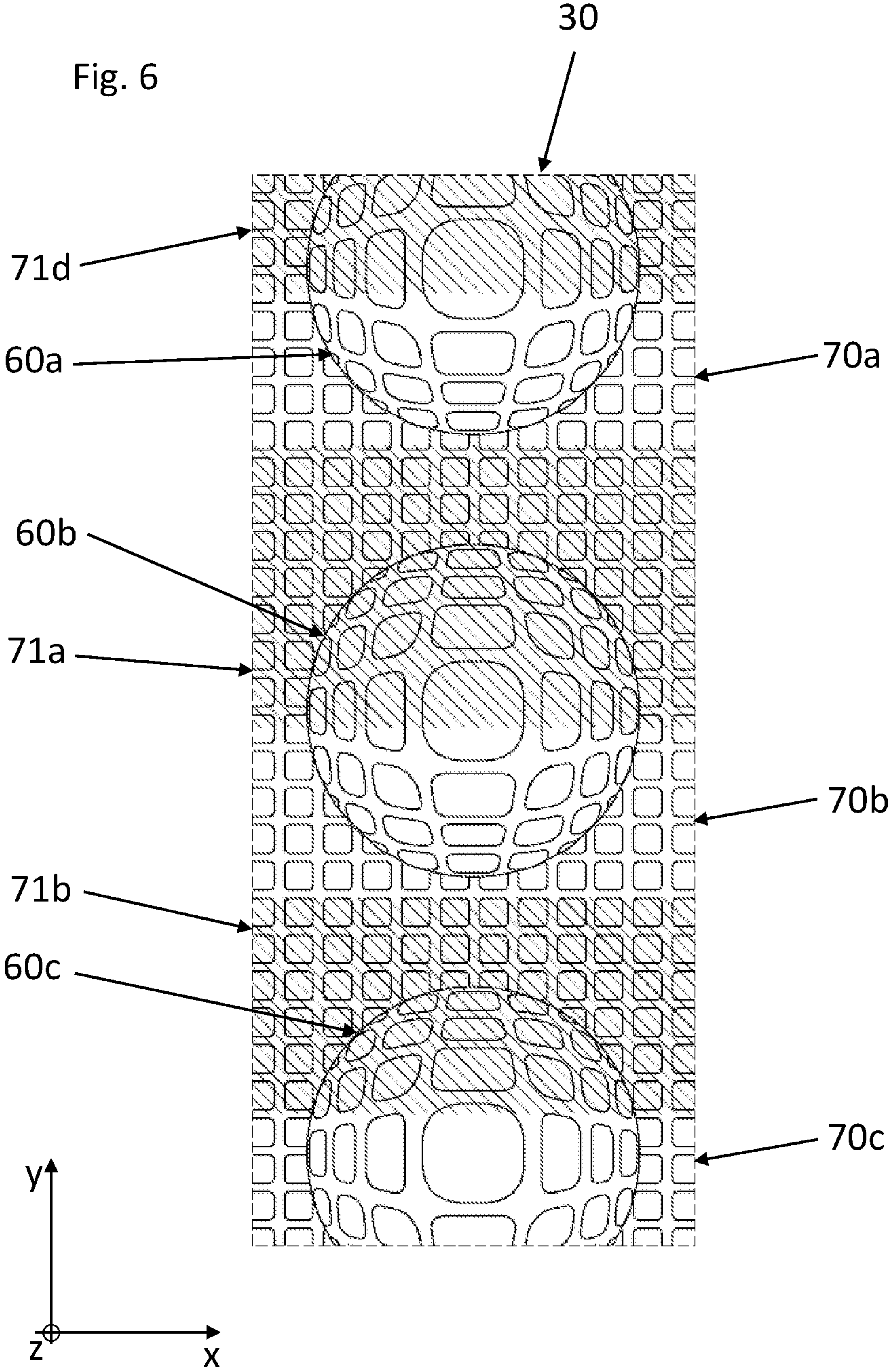
FIG. 6 shows the pattern 30 at a fourth viewing angle.

An example of the (second) kinematic effect is shown in FIGS. 5 and 6. The pattern 30 of FIGS. 3 and 4 is shown in FIGS. 5 and 6. In this case, FIG. 5 shows the pattern at a third viewing angle and FIG. 6 shows the pattern at a fourth viewing angle. A transition from the third viewing angle to the fourth viewing angle can be achieved by tilting the security element 10 having the pattern 30 about a second axis, for example about the x axis.

In the pattern 30, an additional motif 70 (70*a*, 70*b*, 70*c*) or a plurality of additional motifs 70*a*, 70*b*, 70*c* may be visible to the viewer at the third viewing angle.

By tilting the security element 10 about the second axis, a position of the additional motif 70 or of each of the additional motifs 70*a*, 70*b*, 70*c* in the pattern 30 may be altered. By tilting the security element 10, the position of the additional motif 70 or the positions of the additional motifs 70*a*, 70*b*, 70*c* may move in one direction. In particular, the position of the additional motif 70 or the positions the additional motifs 70*a*, 70*b*, 70*c* may vary in a first direction by tilting the security element 10 in one direction and in a second direction by tilting the security element 10 in another direction. The first and second directions may be different directions, in particular opposite directions.

The additional motif 70 may be a brightly acting section. Each of the additional motifs 70*a*, 70*b*, 70*c* may respectively be a brightly acting section. In particular, the brightly acting section comprises at least two, in particular a plurality of, brightly acting subsections. The brightly acting subsections may be spaced apart from one another. Various additional motifs 70*a*, 70*b*, 70*c* or various brightly acting subsections may change their position in different directions by tilting the security element 10 in one direction.

An additional motif 70 may be adjoined by a dark section 71 (71*a*, 71*b*, 71*c*, 71*d*). The additional motif 70 may be enclosed by at least one dark section 71 (71*a*, 71*b*, 71*c*, 71*d*), in particular by at least two dark sections 71 (71*a*, 71*b*, 71*c*, 71*d*).

A plurality of dark sections 71*a*, 71*b*, 71*c*, 71*d* may be visible to the viewer in the pattern 30.

Preferably, at least two additional motifs 70*a*, 70*b*, 70*c* and at least two dark sections 71*a*, 71*b*, 71*c*, 71*d* are visible to the viewer in the pattern 30 at a first viewing angle. The at least two additional motifs 70*a*, 70*b*, 70*c* and the at least two dark sections 71*a*, 71*b*, 71*c*, 71*d* may be visible to the viewer at a different position in the pattern 30 at the second viewing angle than at the first viewing angle.

The at least two additional motifs 70*a*, 70*b*, 70*c* and the at least two dark sections 71*a*, 71*b*, 71*c*, 71*d* may be perceived by the viewer as moving continuously in the pattern 30 by tilting the security element 10 about an axis, in particular the second axis.

A dark section 71*a*, 71*b*, 71*c*, 71*d* may be visible to the viewer between two additional motifs 70*a*, 70*b*, 70*c*.

The additional motif 30 may be in the form of a strip. The additional motif 70 may be a geometrical figure, for example a polygon. In particular, the additional motif 70 is a triangle, a quadrilateral, in particular a rectangle or a square, an n-sided polygon or a circle.

During tilting of the security element 10 about the first axis, the position of the additional motif 70 or the positions of the additional motifs 70*a*, 70*b*, 70*c* may remain unchanged. Alternatively, or in addition, the shape and/or size of the pattern elements 50, 50*a* may remain unchanged during tilting of the security element 10 about the second axis.

Figure 7:
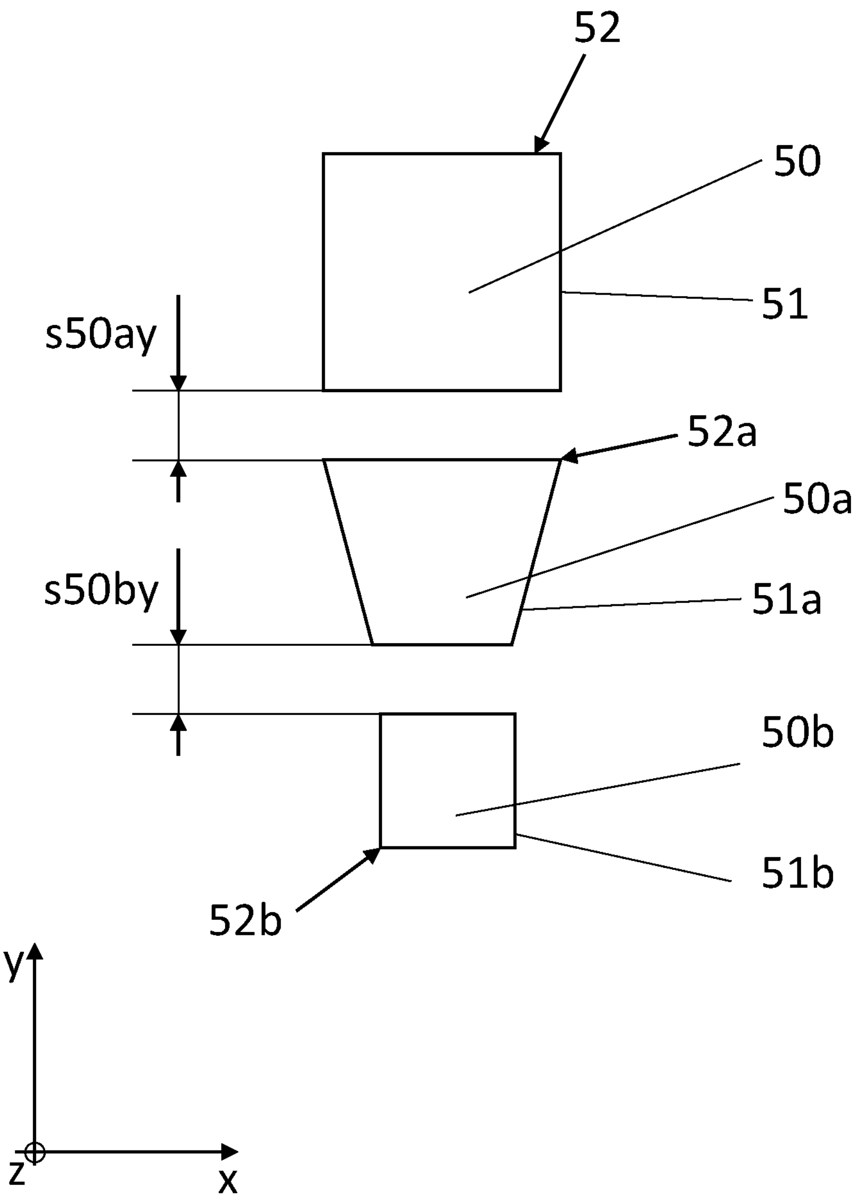
FIG. 7 shows pattern elements 50, 50*a*, 50*b* of a pattern 30.

FIG. 7 shows pattern elements 50, 50*a* and 50*b*, which will also be referred to below as a first pattern element 50 (first submotif), second pattern element 50*a* (second submotif) and third pattern element 50*b* (third submotif). The pattern elements of the pattern may comprise the first pattern element, the second pattern element and the third pattern element.

In general, contours 51, 51*a* and 51*b* of the pattern elements may be represented darkly for reasons of technical representation. These contours may act brightly for the viewer in the security element.

For example, the first pattern element 50 and the second pattern element 50*a* may be visible in the motif 60 as represented in FIG. 2. The third pattern element 50*b* may be visible outside the motif 60, for example in the first section 65*a* or the second section 65*b*.

The first pattern element 50 may have a contour 51. A shape 52 (submotif shape) of the first pattern element 50 may be defined by the contour 51. The first pattern element 50 may have a shape 52 (submotif shape) without having a contour 51.

The second pattern element 50*a* may have a contour 51*a*. A shape 52*a* (submotif shape) of the second pattern element 50*a* may be defined by the contour 51*a*. The second pattern element 50*a* may have a shape 52*a* (submotif shape) without having a contour 51*a*.

The third pattern element 50*b* may have a contour 51*b*. A shape 52*b* (submotif shape) of the third pattern element 50*b* may be defined by the contour 51*b*. The third pattern element 50*b* may have a shape 52*b* (submotif shape) without having a contour 51*b*.

The shape 52 of the first pattern element 50, which is visible in the motif 60, and the shape 52*b* of the third pattern element 50*b*, which is visible outside the motif 60, may correspond to one another.

The shape 52 of the first pattern element 50, which is visible in the motif 60, and the shape 52*a* of the second pattern element 50*a*, which is visible in the motif 60, may not correspond to one another.

The shape 52*a* of the second pattern element 50*a*, which is visible in the motif 60, and the shape 52*b* of the third pattern element 50*b*, which is visible outside the motif 60, may not correspond to one another.

Pattern elements outside the motif 60 may have an identical shape.

Pattern elements in the motif 60 may have identical shapes. Alternatively, or in addition, pattern elements in the motif 60 may have shapes which correspond to one another. Alternatively, or in addition, pattern elements in the motif 60 may have shapes which do not correspond to one another.

A spacing s50*ay* may be visible between the first pattern element 50 and the second pattern element 50*a*. The spacing s50*ay* may be visible in the direction of the y axis.

A spacing s50*by* may be visible between the second pattern element 50*a* and the third pattern element 50*b*. The spacing s50*by* may be visible in the direction of the y axis.

The spacing s50*ay* between the first pattern element 50 and the second pattern element 50*a* may be greater than the spacing s50*by* between the second pattern element 50*a* and the third pattern element 50*b*.

The spacing s50*ay* between the first pattern element 50 and the second pattern element 50*a* may be equal to the spacing s50*by* between the second pattern element 50*a* and the third pattern element 50*b*.

The spacing s50*ay* between the first pattern element 50 and the second pattern element 50*a* may be less than the spacing s50*by* between the second pattern element 50*a* and the third pattern element 50*b*.

Between pattern elements in the motif 60, spacings in the direction of the y axis may be equal. Alternatively, or in addition, spacings between pattern elements in the motif 60 in the direction of the y axis may be different.

Between pattern elements in the motif 60, spacings in the direction of the x axis may be equal. Alternatively, or in addition, spacings between pattern elements in the motif 60 in the direction of the x axis may be different.

Between pattern elements outside the motif 60, spacings in the direction of the y axis may be equal. Alternatively, or in addition, spacings between pattern elements outside the motif 60 in the direction of the y axis may be different.

Between pattern elements outside the motif 60, spacings in the direction of the x axis may be equal. Alternatively, or in addition, spacings between pattern elements outside the motif 60 in the direction of the x axis may be different.

Figure 8:
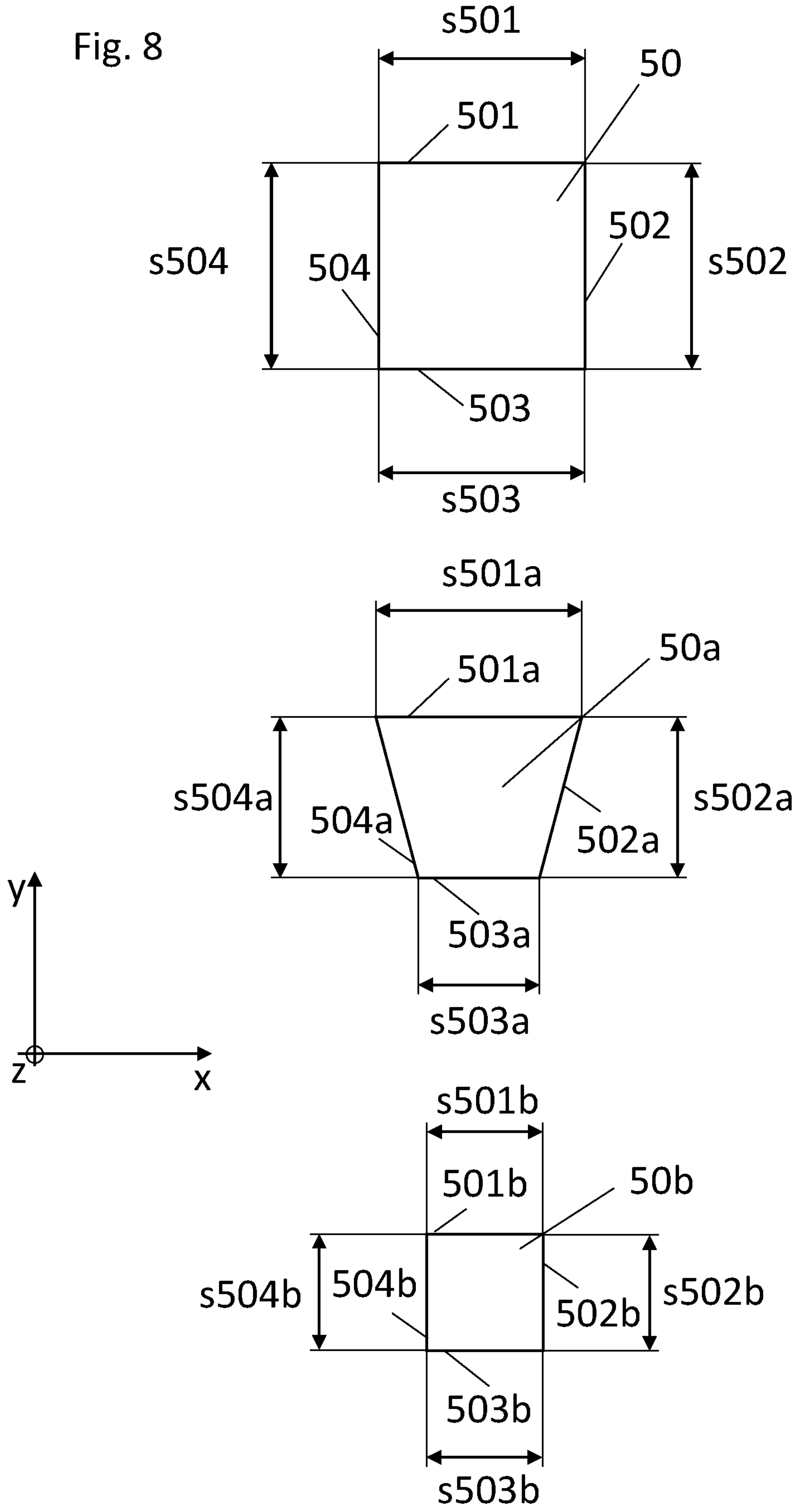
FIG. 8 shows pattern elements 50, 50*a*, 50*b* of a pattern 30.

FIG. 8 shows pattern elements 50, 50*a* and 50*b*, which will also be referred to below as a first pattern element 50 (first submotif), second pattern element 50*a* (second submotif) and third pattern element 50*b* (third submotif). The pattern elements of the pattern may comprise the first pattern element, the second pattern element and the third pattern element. The pattern elements described with reference to FIG. 8 may be the pattern elements described with reference to FIG. 7.

The first pattern element 50 may have a first side 501. The first pattern element 50 may have a second side 502. The first pattern element 50 may have a third side 503. The first pattern element 50 may have a fourth side 504.

The first side 501 of the first pattern element 50 may be a section of the contour 51 of the first pattern element 50. The second side 502 of the first pattern element 50 may be a section of the contour 51 of the first pattern element 50. The third side 503 of the first pattern element 50 may be a section of the contour 51 of the first pattern element 50. The fourth side 504 of the first pattern element 50 may be a section of the contour 51 of the first pattern element 50.

The second pattern element 50*a* may have a first side 501*a*. The second pattern element 50*a* may have a second side 502*a*. The second pattern element 50*a* may have a third side 503*a*. The second pattern element 50*a* may have a fourth side 504*a*.

The first side 501*a* of the second pattern element 50*a* may be a section of the contour 51*a* of the second pattern element 50*a*. The second side 502*a* of the second pattern element 50*a* may be a section of the contour 51*a* of the second pattern element 50*a*. The third side 503*a* of the second pattern element 50*a* may be a section of the contour 51*a* of the second pattern element 50*a*. The fourth side 504*a* of the second pattern element 50*a* may be a section of the contour 51*a* of the second pattern element 50*a*.

The third pattern element 50*b* may have a first side 501*b*. The third pattern element 50*b* may have a second side 502*b*. The third pattern element 50*b* may have a third side 503*b*. The third pattern element 50*b* may have a fourth side 504*b*.

The first side 501*a* of the third pattern element 50*b* may be a section of the contour 51*b* of the third pattern element 50*b*. The second side 502*b* of the third pattern element 50*b* may be a section of the contour 51*b* of the third pattern element 50*b*. The third side 503*b* of the third pattern element 50*b* may be a section of the contour 51*b* of the third pattern element 50b. The fourth side 504b of the third pattern element 50b may be a section of the contour 51b of the third pattern element 50b.

The first side 501 of the first pattern element 50 may be parallel to the third side 503 of the first pattern element 50. Alternatively, or in addition, the second side 502 of the first pattern element 50 may be parallel to the fourth side 504 of the first pattern element 50.

The first side 501 may have a first length (extent) s501. The second side 502 may have a second length (extent) s502. The third side 503 may have a third length (extent) s503. The fourth side 504 may have a fourth length (extent) s501.

At least two of the first length s501, the second length s502, the third length s503 and the fourth length s504 may be equal to one another. At least three of the first length s501, the second length s502, the third length s503 and the fourth length s504 may be equal to one another. Each of the first length s501, the second length s502, the third length s503 and the fourth length s504 may be equal to one another.

At least two of the first length s501, the second length s502, the third length s503 and the fourth length s504 may be different than one another. At least three of the first length s501, the second length s502, the third length s503 and the fourth length s504 may be different than one another. Each of the first length s501, the second length s502, the third length s503 and the fourth length s504 may be different than one another.

The first side 501a of the second pattern element 50a may be parallel to the third side 503a of the second pattern element 50a. Alternatively or in addition, the second side 502a of the second pattern element 50a may be nonparallel to the fourth side 504a of the second pattern element 50a.

The first side 501a may have a first length (extent) s501a. The second side 502a may have a second length (extent) s502a. The third side 503a may have a third length (extent) s503a. The fourth side 504a may have a fourth length (extent) s501a.

At least two of the first length s501a, the second length s502a, the third length s503a and the fourth length s504a may be equal to one another. At least three of the first length s501a, the second length s502a, the third length s503a and the fourth length s504a may be equal to one another. Each of the first length s501a, the second length s502a, the third length s503a and the fourth length s504a may be equal to one another.

At least two of the first length s501a, the second length s502a, the third length s503a and the fourth length s504a may be different than one another. At least three of the first length s501a, the second length s502a, the third length s503a and the fourth length s504a may be different than one another. Each of the first length s501a, the second length s502a, the third length s503a and the fourth length s504a may be different than one another.

The first side 501b of the third pattern element 50b may be parallel to the third side 503b of the third pattern element 50b. Alternatively or in addition, the second side 502b of the second pattern element 50b may be parallel to the fourth side 504b of the third pattern element 50b.

The first side 501b may have a first length (extent) s501b. The second side 502b may have a second length (extent) s502b. The third side 503a may have a third length (extent) s503b. The fourth side 504b may have a fourth length (extent) s501b.

At least two of the first length s501b, the second length s502b, the third length s503b and the fourth length s504b may be equal to one another. At least three of the first length s501b, the second length s502b, the third length s503b and the fourth length s504b may be equal to one another. Each of the first length s501b, the second length s502b, the third length s503b and the fourth length s504b may be equal to one another.

At least two of the first length s501b, the second length s502b, the third length s503b and the fourth length s504b may be different than one another. At least three of the first length s501b, the second length s502b, the third length s503b and the fourth length s504b may be different than one another. Each of the first length s501b, the second length s502b, the third length s503b and the fourth length s504b may be different than one another.

At least one of the first length s501, the second length s502, the third length s503 and the fourth length s504 of the first pattern element 50 may be equal to at least one of the first length s501a, the second length s502a, the third length s503a and the fourth length s504a of the second pattern element 50a.

At least one of the first length s501, the second length s502, the third length s503 and the fourth length s504 of the first pattern element 50 may be different than at least one of the first length s501a, the second length s502a, the third length s503a and the fourth length s504a of the second pattern element 50a.

At least two of the first length s501, the second length s502, the third length s503 and the fourth length s504 of the first pattern element 50 may be equal to at least two of the first length s501a, the second length s502a, the third length s503a and the fourth length s504a of the second pattern element 50a.

At least two of the first length s501, the second length s502, the third length s503 and the fourth length s504 of the first pattern element 50 may be different than at least two of the first length s501a, the second length s502a, the third length s503a and the fourth length s504a of the second pattern element 50a.

At least one of the first length s501, the second length s502, the third length s503 and the fourth length s504 of the first pattern element 50 may be equal to at least one of the first length s501b, the second length s502b, the third length s503b and the fourth length s504b of the third pattern element 50b.

At least one of the first length s501, the second length s502, the third length s503 and the fourth length s504 of the first pattern element 50 may be different than at least one of the first length s501b, the second length s502b, the third length s503b and the fourth length s504b of the third pattern element 50b.

At least two of the first length s501, the second length s502, the third length s503 and the fourth length s504 of the first pattern element 50 may be equal to at least two of the first length s501b, the second length s502b, the third length s503b and the fourth length s504b of the third pattern element 50b.

At least two of the first length s501, the second length s502, the third length s503 and the fourth length s504 of the first pattern element 50 may be different than at least two of the first length s501b, the second length s502b, the third length s503b and the fourth length s504b of the third pattern element 50b.

At least one of the first length s501a, the second length s502a, the third length s503a and the fourth length s504a of the second pattern element 50a may be equal to at least one of the first length s501b, the second length s502b, the third length s503b and the fourth length s504b of the third pattern element 50b.

At least one of the first length s501_a_, the second length s502_a_, the third length s503_a_ and the fourth length s504_a_ of the second pattern element 50_a_ may be different than at least one of the first length s501_b_, the second length s502_b_, the third length s503_b_ and the fourth length s504_b_ of the third pattern element 50_b_.

At least two of the first length s501_a_, the second length s502_a_, the third length s503_a_ and the fourth length s504_a_ of the second pattern element 50_a_ may be equal to at least two of the first length s501_b_, the second length s502_b_, the third length s503_b_ and the fourth length s504_b_ of the third pattern element 50_b_.

At least two of the first length s501_a_, the second length s502_a_, the third length s503_a_ and the fourth length s504_a_ of the second pattern element 50_a_ may be different than at least two of the first length s501_b_, the second length s502_b_, the third length s503_b_ and the fourth length s504_b_ of the third pattern element 50_b_.

Figure 9:
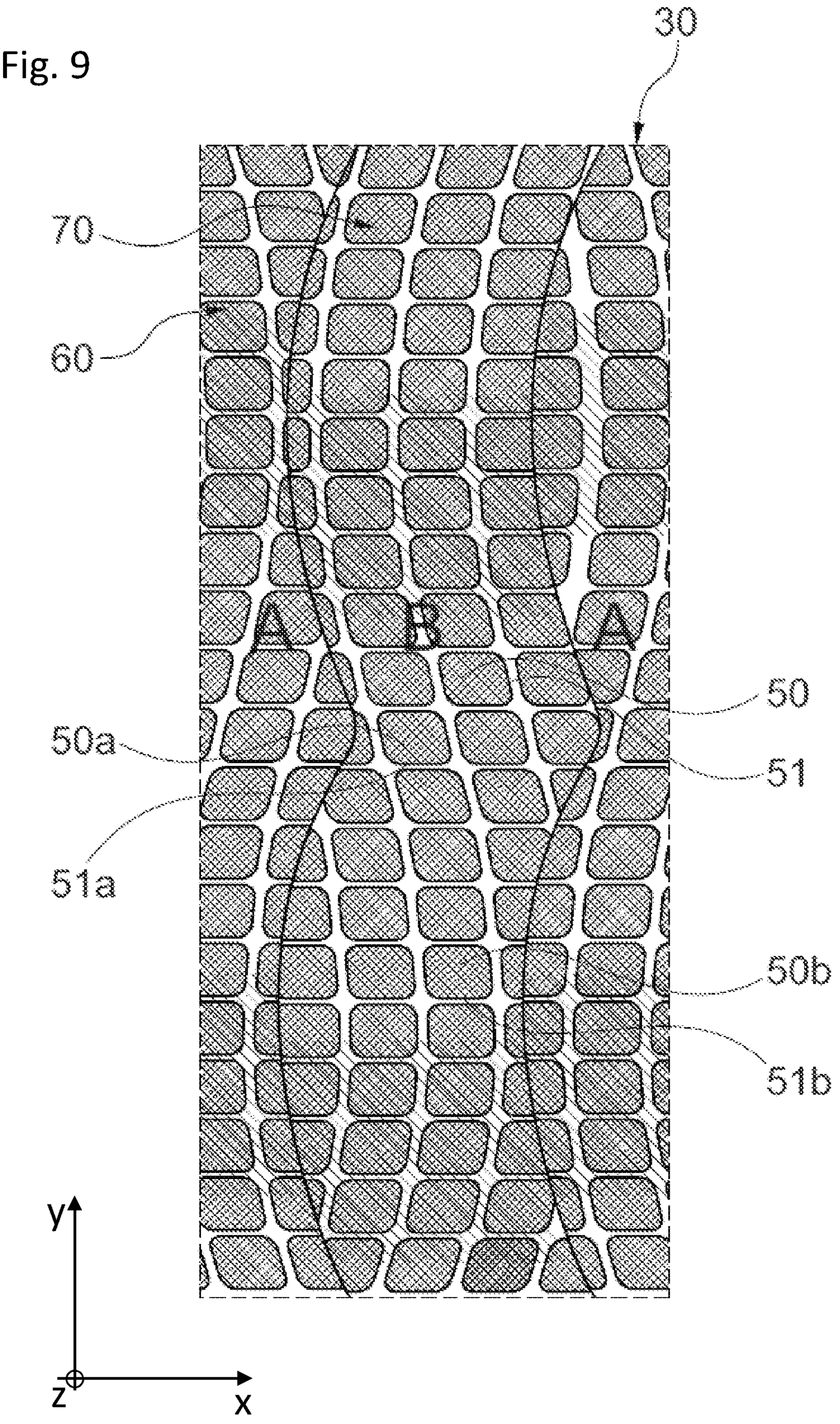
FIG. 9 shows a pattern 30.

FIG. 9 shows a pattern 30. The pattern 30 is visible (perceptible) to a viewer in a motif region 20 of a security element 10 at a first viewing angle.

The security element 10 may define an x-y plane. The x-y plane may define an x axis and a y axis. The x axis may be nonparallel to the y axis. In particular, the x axis is perpendicular to the y axis. The x-y plane may define a z axis. The z axis may be nonparallel to the x-y plane. The z axis may be oriented perpendicularly to the x-y plane.

A multiplicity of pattern elements 50 are visible in the pattern 30. In what follows, pattern elements will generally be summarized by the reference sign 50. Specific pattern elements 50 may be denoted by the reference signs 50, 50_a_ and 50_b_.

A contour 51 of a pattern element 50 may establish the shape of the pattern element 50. The contour 51 of a pattern element 50 may enclose an inner section of the pattern element 50. A pattern element 50 may have a shape without having a contour 51.

In the pattern 30, a motif 60 is perceptible to the viewer. The motif 60 acts three-dimensionally for the viewer. The entire pattern 30 may be three-dimensionally perceptible to the viewer. The entire pattern 30 may be the motif 60.

In the example of FIG. 9, the motif 60 comprises segments A and B. The segments A and B are perceptible to the viewer in such a way that they extend upward and downward in sections (periodically). Here, upward and downward is to be understood in the direction of the z axis. The sectionwise extending upward and downward may act continuously. A snaking line profile may be perceptible to the viewer inside a segment A or B.

The segments A and B may adjoin one another. The motif 60 may be perceptible as extending downward in one section of the segment A and the motif 60 may be perceptible as extending upward in a neighboring section of the segment B. The motif 60 may have a plurality of segments A and B.

The three-dimensional impression of the motif 60 for the viewer is caused by a distortion of pattern elements 50 in the region of the motif 60. In particular, the three-dimensional impression of the motif 60 for the viewer may be caused by a distortion of contours 51 of pattern elements 50 and/or shapes of pattern elements 50 in the region of the motif 60.

At a first viewing angle, a first section of the motif 60 may be perceptible at a first position as extending upward and a second section of the motif 60 may be perceptible at a second position as extending downward. At a second viewing angle the first section of the motif 60 may be perceptible at the first position as extending downward and the second section of the motif 60 may be perceptible at the second position as extending upward. The first and second sections may be different sections.

The first and second viewing angles may be different viewing angles. The first and second viewing angles may be achieved by tilting the security element 10 about a first axis. A light source and the viewer may have an unchanged position during the tilting of the security element.

A (first) kinematic effect, for example a motion effect, may be perceptible to the viewer in the pattern by the tilting about the first axis. The impression that at least sections of the motif are carrying out a snaking movement or an up-and-down movement may be imparted to the viewer. Alternatively, the impression that the pattern elements 50 move may be imparted to the viewer. The movement of the pattern elements 50 may be configured and perceptible to the viewer substantially identically to the movement of the pattern elements 50 as described with reference to FIGS. 3 and 4.

The tilting of the security element 10 for the first kinematic effect may take place about the y axis.

The motif 60 may be perceived by the viewer in such a way that the motif 60 extends at least in sections in the direction of the z axis. The motif 60 may be perceived by the viewer in such a way that the motif 60 extends in front of or behind the x-y plane at least in sections. The motif 60 may be perceived by the viewer as a curved surface. The motif 60 may be perceived by the viewer as a nonplanar surface.

An additional motif 70 may be perceptible to the viewer, for example as a brightly acting section, in the pattern 30. In particular, at least two, preferably at least three, more preferably at least five, additional motifs 70 are perceptible to the viewer in the pattern 30. All additional motifs 70 may have the properties of an additional motif 70.

Brightly acting sections 70 and non-brightly acting sections may alternate (periodically) in the pattern.

In the brightly acting section 70, the pattern 30, in particular pattern elements 50 of the pattern 30, may act more brightly than outside the brightly acting section 70.

At a first viewing angle, the additional pattern 70 may be perceptible to the viewer at a first position. At a second viewing angle, the additional pattern may be perceptible to the viewer at a second position. At a third viewing angle, the additional pattern 70 may be perceptible to the viewer at a third position.

The first, second and third positions may be different positions. The first, second and third positions may lie along an (arcuate) line.

The first, second and third viewing angles may be different viewing angles. The first, second and third second viewing angles may be achieved by tilting the security element 10 about a second axis. A light source and the viewer may have an unchanged position during the tilting of the security element 10.

A second kinematic effect, for example a motion effect, may be perceptible to the viewer in the pattern by the tilting about the second axis. The impression that the additional motif 70, in particular the brightly acting section 70, runs or rolls through the pattern 30 may be imparted to the viewer.

In the pattern 30 or the motif 60, a plurality of additional patterns 70 may be visible as running counter to one another by the second kinematic effect. In particular, in the pattern 30 or the motif 60, one additional pattern 70 in segment A and one additional pattern 70 in segment B may be perceptible as running counter to one another.

The tilting of the security element 10 for the second kinematic effect may take place about the x axis. The second kinematic effect may be configured and perceptible to the viewer substantially identically to the kinematic effect as described with reference to FIGS. 5 and 6.

Figure 10:
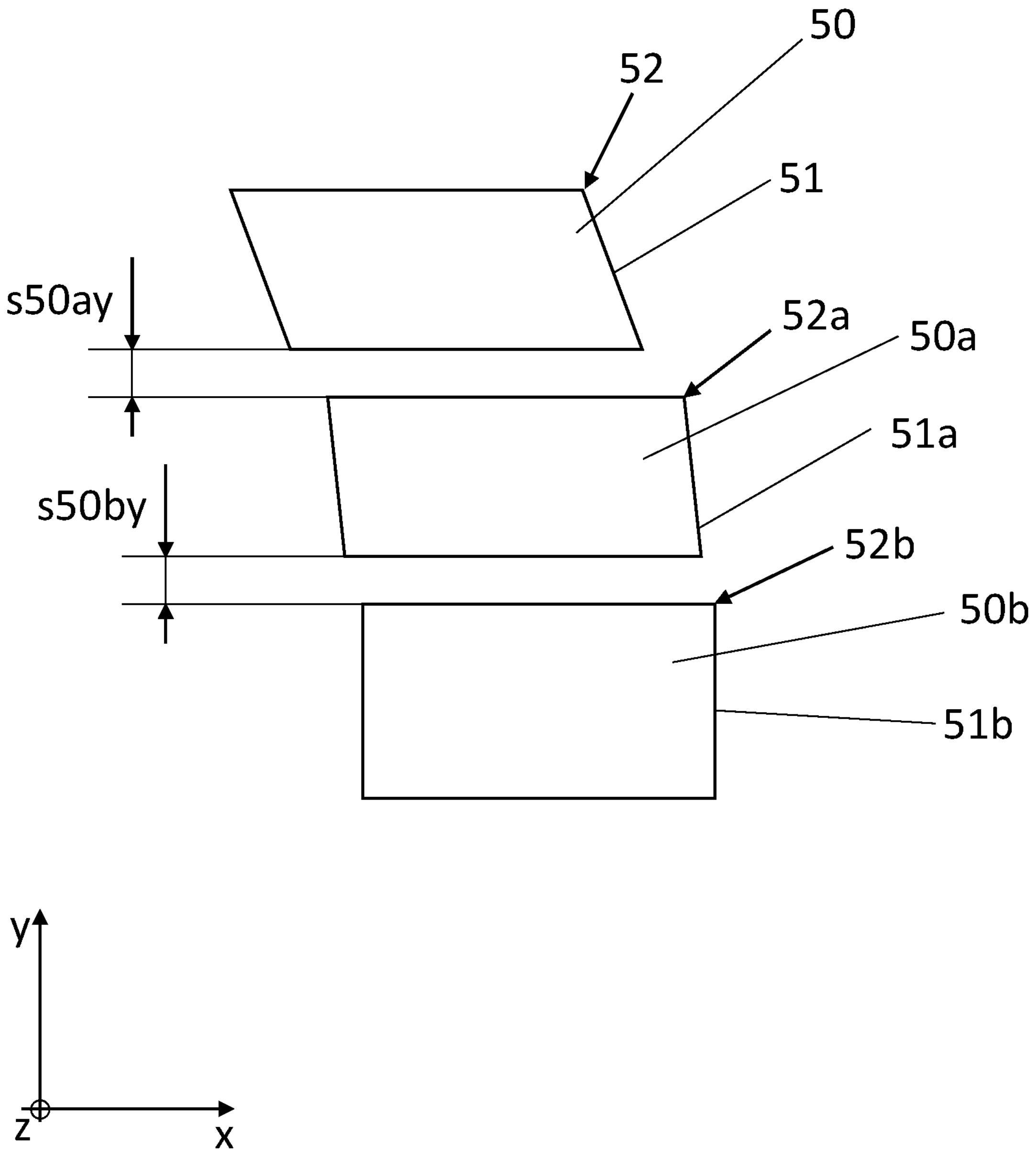
FIG. 10 shows pattern elements 50, 50*a*, 50*b* of a pattern 30.

FIG. 10 shows pattern elements 50, 50*a* and 50*b*, which will also be referred to below as a first pattern element 50 (first submotif), second pattern element 50*a* (second submotif) and third pattern element 50*b* (third submotif). The pattern elements of the pattern may comprise the first pattern element, the second pattern element and the third pattern element.

The first pattern element 50 may have a contour 51. A shape 52 (submotif shape) of the first pattern element 50 may be defined by the contour 51. The first pattern element 50 may have a shape 52 (submotif shape) without having a contour 51.

The second pattern element 50*a* may have a contour 51*a*. A shape 52*a* (submotif shape) of the second pattern element 50*a* may be defined by the contour 51*a*. The second pattern element 50*a* may have a shape 52*a* (submotif shape) without having a contour 51*a*.

The third pattern element 50*b* may have a contour 51*b*. A shape 52*b* (submotif shape) of the third pattern element 50*b* may be defined by the contour 51*b*. The third pattern element 50*b* may have a shape 52*b* (submotif shape) without having a contour 51*b*.

The shape 50 of the first pattern element 50 and the shape 50*b* of the third pattern element 50*b* may be distorted in relation to one another.

The shape 50 of the first pattern element 50 and the shape 50*a* of the second pattern element 50*a* may not correspond to one another.

The shape 50*a* of the second pattern element 50*a* and the shape 50*b* of the third pattern element 50*b* may be distorted in relation to one another.

The shape 50*a* of the second pattern element 50*a* and the shape 50*b* of the third pattern element 50*b* may not correspond to one another.

Pattern elements 50 in the motif 60 may have identical shapes. Alternatively, or in addition, pattern elements 50 in the motif 60 may have shapes which correspond to one another. Alternatively, or in addition, pattern elements in the motif 60 may have shapes which do not correspond to one another.

Pattern elements 50 arranged in one direction, for example in the direction of the x axis, may have an identical or corresponding shape. At least two, preferably at least three pattern elements 50 may be visible (next to one another) in one direction.

A spacing s50*ay* may be visible between the first pattern element 50 and the second pattern element 50*a*. The spacing s50*ay* may be visible in the direction of the y axis.

A spacing s50*by* may be visible between the second pattern element 50*a* and the third pattern element 50*b*. The spacing s50*by* may be visible in the direction of the y axis.

The spacing s50*ay* between the first pattern element 50 and the second pattern element 50*a* may be greater than the spacing s50*by* between the second pattern element 50*a* and the third pattern element 50*b*.

The spacing s50*ay* between the first pattern element 50 and the second pattern element 50*a* may be equal to the spacing s50*by* between the second pattern element 50*a* and the third pattern element 50*b*.

The spacing s50*ay* between the first pattern element 50 and the second pattern element 50*a* may be less than the spacing s50*by* between the second pattern element 50*a* and the third pattern element 50*b*.

Between pattern elements in the motif 60, spacings in the direction of the y axis may be equal. Alternatively, or in addition, spacings between pattern elements in the motif 60 in the direction of the y axis may be different.

Between pattern elements in the motif 60, spacings in the direction of the x axis may be equal. Alternatively, or in addition, spacings between pattern elements in the motif 60 in the direction of the x axis may be different.

Figure 11:
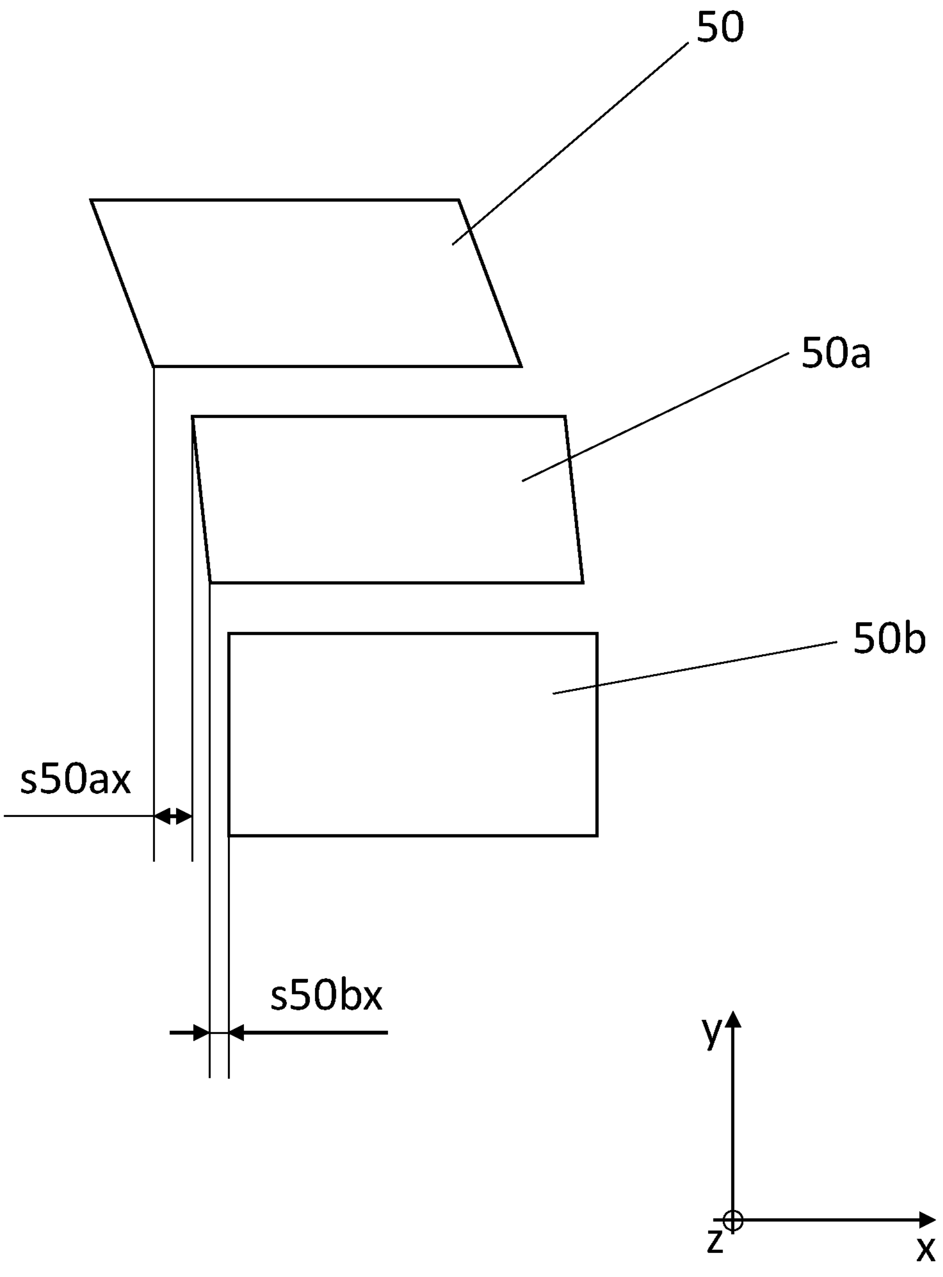
FIG. 11 shows pattern elements 50, 50*a*, 50*b* of a pattern 30.

FIG. 11 shows pattern elements 50, 50*a* and 50*b*, which will also be referred to below as a first pattern element 50 (first submotif), second pattern element 50*a* (second submotif) and third pattern element 50*b* (third submotif). The pattern elements of the pattern may comprise the first pattern element, the second pattern element and the third pattern element. The pattern elements described with reference to FIG. 11 may be the pattern elements described with reference to FIG. 10.

An offset s50*ax* may be visible between the first pattern element 50 and the second pattern element 50*a*. The offset s50*ax* may be visible in the direction of the x axis.

An offset s50*bx* may be visible between the second pattern element 50*a* and the third pattern element 50*b*. The offset s50*bx* may be visible in the direction of the x axis.

An offset may be the spacing between two neighboring sides of different pattern elements in a direction of the side. An offset may be a deviation of the positions of pattern elements.

The offset s50*ax* between the first pattern element 50 and the second pattern element 50*a* may be greater than the offset s50*bx* between the second pattern element 50*a* and the third pattern element 50*b*.

The offset s50*ax* between the first pattern element 50 and the second pattern element 50*a* may be equal to the offset s50*bx* between the second pattern element 50*a* and the third pattern element 50*b*.

The offset s50*ax* between the first pattern element 50 and the second pattern element 50*a* may be less than the offset s50*bx* between the second pattern element 50*a* and the third pattern element 50*b*.

Between pattern elements in the motif 60, a respective offset may be equal.

Alternatively, or in addition, a respective offset between pattern elements in the motif 60 may be different in the direction of the y axis or the x axis.

Figure 12:
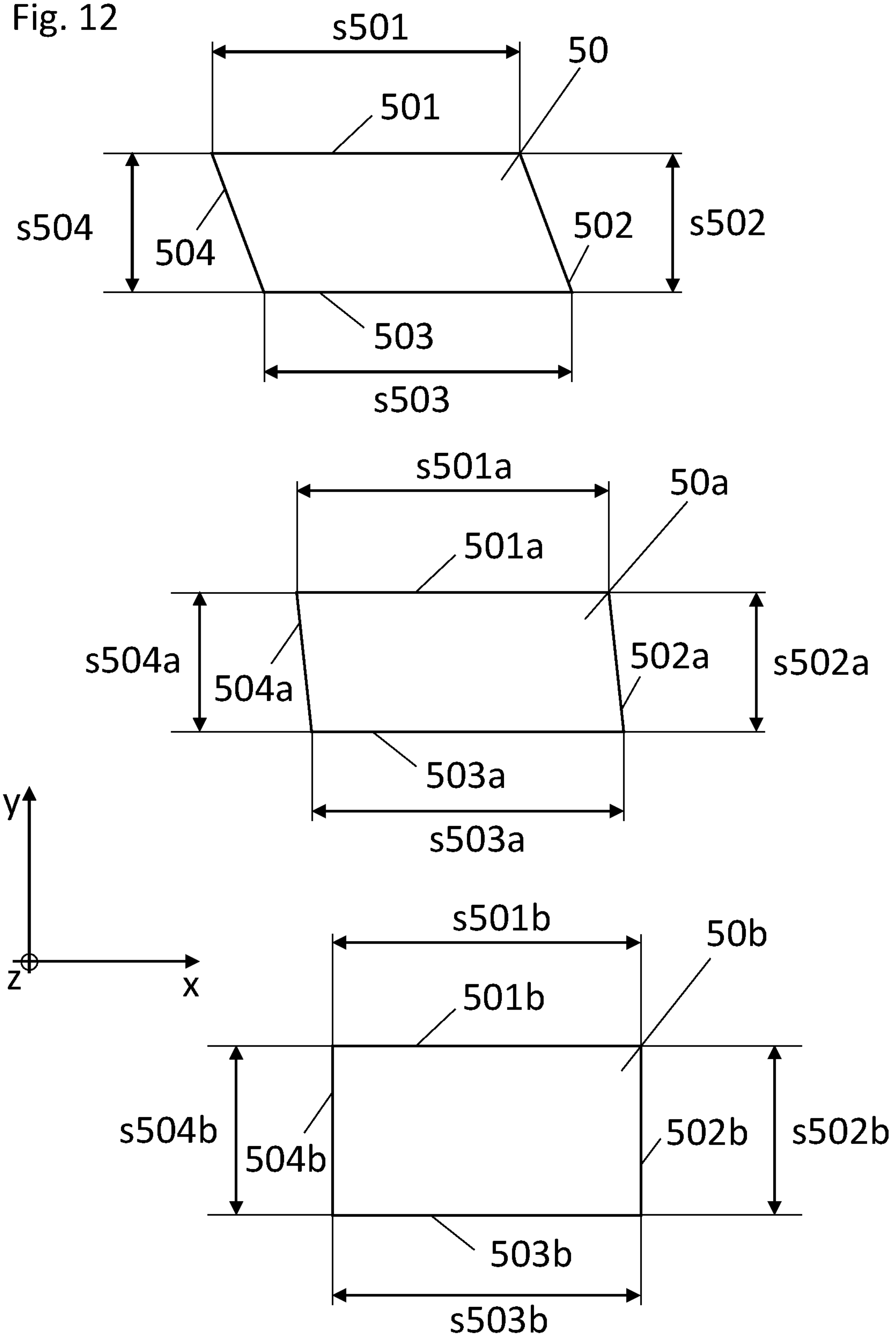
FIG. 12 shows pattern elements 50, 50*a*, 50*b* of a pattern 30.

FIG. 12 shows pattern elements 50, 50*a* and 50*b*, which will also be referred to below as a first pattern element 50 (first submotif), second pattern element 50*a* (second submotif) and third pattern element 50*b* (third submotif). The pattern elements of the pattern may comprise the first pattern element, the second pattern element and the third pattern element. The pattern elements described with reference to FIG. 12 may be the pattern elements described with reference to FIGS. 10 and/or 11.

The first pattern element 50 may have a first side 501. The first pattern element 50 may have a second side 502. The first pattern element 50 may have a third side 503. The first pattern element 50 may have a fourth side 504.

The first side 501 of the first pattern element 50 may be a section of the contour 51 of the first pattern element 50. The second side 502 of the first pattern element 50 may be a section of the contour 51 of the first pattern element 50. The third side 503 of the first pattern element 50 may be a section of the contour 51 of the first pattern element 50. The fourth side 504 of the first pattern element 50 may be a section of the contour 51 of the first pattern element 50.

The second pattern element 50*a* may have a first side 501*a*. The second pattern element 50*a* may have a second side 502*a*. The second pattern element 50*a* may have a third side 503*a*. The second pattern element 50*a* may have a fourth side 504*a*.

The first side 501*a* of the second pattern element 50*a* may be a section of the contour 51*a* of the second pattern element 50*a*. The second side 502*a* of the second pattern element 50*a* may be a section of the contour 51*a* of the second pattern element 50*a*. The third side 503*a* of the second pattern element 50*a* may be a section of the contour 51*a* of the second pattern element 50*a*. The fourth side 504*a* of the second pattern element 50*a* may be a section of the contour 51*a* of the second pattern element 50*a*.

The third pattern element 50*b* may have a first side 501*b*. The third pattern element 50*b* may have a second side 502*b*. The third pattern element 50*b* may have a third side 503*b*. The third pattern element 50*b* may have a fourth side 504*b*.

The first side 501*b* of the third pattern element 50*b* may be a section of the contour 51*b* of the third pattern element 50*b*. The second side 502*b* of the third pattern element 50*b* may be a section of the contour 51*b* of the third pattern element 50*b*. The third side 503*b* of the third pattern element 50*b* may be a section of the contour 51*b* of the third pattern element 50*b*. The fourth side 504*b* of the third pattern element 50*b* may be a section of the contour 51*b* of the third pattern element 50*b*.

The first side 501 of the first pattern element 50 may be parallel to the third side 503 of the first pattern element 50. Alternatively, or in addition, the second side 502 of the first pattern element 50 may be parallel to the fourth side 504 of the first pattern element 50.

An angle which is less than 90°, preferably less than 85°, more preferably less than 80°, may be formed between the second side 502 of the first pattern element 50 and the third side 503 of the first pattern element 50.

The first side 501 may have a first length (extent) s501. The second side 502 may have a second length (extent) s502. The third side 503 may have a third length (extent) s503. The fourth side 504 may have a fourth length (extent) s501.

At least two of the first length s501, the second length s502, the third length s503 and the fourth length s504 may be equal to one another. At least three of the first length s501, the second length s502, the third length s503 and the fourth length s504 may be equal to one another. Each of the first length s501, the second length s502, the third length s503 and the fourth length s504 may be equal to one another.

At least two of the first length s501, the second length s502, the third length s503 and the fourth length s504 may be different than one another. At least three of the first length s501, the second length s502, the third length s503 and the fourth length s504 may be different than one another. Each of the first length s501, the second length s502, the third length s503 and the fourth length s504 may be different than one another.

The first side 501*a* of the second pattern element 50*a* may be parallel to the third side 503*a* of the second pattern element 50*a*. Alternatively, or in addition, the second side 502*a* of the second pattern element 50*a* may be parallel to the fourth side 504*a* of the second pattern element 50*a*.

An angle which is less than 90°, preferably less than 85°, more preferably less than 80°, may be formed between the second side 502*a* of the second pattern element 50*a* and the third side 503*a* of the second pattern element 50*a*.

The first side 501*a* may have a first length (extent) s501*a*. The second side 502*a* may have a second length (extent) s502*a*. The third side 503*a* may have a third length (extent) s503*a*. The fourth side 504*a* may have a fourth length (extent) s501*a*.

At least two of the first length s501*a*, the second length s502*a*, the third length s503*a* and the fourth length s504*a* may be equal to one another. At least three of the first length s501*a*, the second length s502*a*, the third length s503*a* and the fourth length s504*a* may be equal to one another. Each of the first length s501*a*, the second length s502*a*, the third length s503*a* and the fourth length s504*a* may be equal to one another.

At least two of the first length s501*a*, the second length s502*a*, the third length s503*a* and the fourth length s504*a* may be different than one another. At least three of the first length s501*a*, the second length s502*a*, the third length s503*a* and the fourth length s504*a* may be different than one another. Each of the first length s501*a*, the second length s502*a*, the third length s503*a* and the fourth length s504*a* may be different than one another.

The first side 501*b* of the third pattern element 50*b* may be parallel to the third side 503*b* of the third pattern element 50*b*. Alternatively or in addition, the second side 502*b* of the third pattern element 50*b* may be parallel to the fourth side 504*b* of the third pattern element 50*b*.

The first side 501*b* may have a first length (extent) s501*b*. The second side 502*b* may have a second length (extent) s502*b*. The third side 503*b* may have a third length (extent) s503*b*. The fourth side 504*b* may have a fourth length (extent) s501*b*.

At least two of the first length s501*b*, the second length s502*b*, the third length s503*b* and the fourth length s504*b* may be equal to one another. At least three of the first length s501*b*, the second length s502*b*, the third length s503*b* and the fourth length s504*b* may be equal to one another. Each of the first length s501*b*, the second length s502*b*, the third length s503*b* and the fourth length s504*b* may be equal to one another.

At least two of the first length s501*b*, the second length s502*b*, the third length s503*b* and the fourth length s504*b* may be different than one another. At least three of the first length s501*b*, the second length s502*b*, the third length s503*b* and the fourth length s504*b* may be different than one another. Each of the first length s501*b*, the second length s502*b*, the third length s503*b* and the fourth length s504*b* may be different than one another.

At least one of the first length s501, the second length s502, the third length s503 and the fourth length s504 of the first pattern element 50 may be equal to at least one of the first length s501*a*, the second length s502*a*, the third length s503*a* and the fourth length s504*a* of the second pattern element 50*a*.

At least one of the first length s501, the second length s502, the third length s503 and the fourth length s504 of the first pattern element 50 may be different than at least one of the first length s501*a*, the second length s502*a*, the third length s503*a* and the fourth length s504*a* of the second pattern element 50*a*.

At least two of the first length s501, the second length s502, the third length s503 and the fourth length s504 of the first pattern element 50 may be equal to at least two of the first length s501*a*, the second length s502*a*, the third length s503*a* and the fourth length s504*a* of the second pattern element 50*a*.

At least two of the first length s501, the second length s502, the third length s503 and the fourth length s504 of the first pattern element 50 may be different than at least two of the first length s501*a*, the second length s502*a*, the third length s503*a* and the fourth length s504*a* of the second pattern element 50*a*.

At least one of the first length s501, the second length s502, the third length s503 and the fourth length s504 of the first pattern element 50 may be equal to at least one of the first length s501*b*, the second length s502*b*, the third length s503*b* and the fourth length s504*b* of the third pattern element 50*b*.

At least one of the first length s501, the second length s502, the third length s503 and the fourth length s504 of the first pattern element 50 may be different than at least one of the first length s501*b*, the second length s502*b*, the third length s503*b* and the fourth length s504*b* of the third pattern element 50*b*.

At least two of the first length s501, the second length s502, the third length s503 and the fourth length s504 of the first pattern element 50 may be equal to at least two of the first length s501*b*, the second length s502*b*, the third length s503*b* and the fourth length s504*b* of the third pattern element 50*b*.

At least two of the first length s501, the second length s502, the third length s503 and the fourth length s504 of the first pattern element 50 may be different than at least two of the first length s501*b*, the second length s502*b*, the third length s503*b* and the fourth length s504*b* of the third pattern element 50*b*.

At least one of the first length s501*a*, the second length s502*a*, the third length s503*a* and the fourth length s504*a* of the second pattern element 50*a* may be equal to at least one of the first length s501*b*, the second length s502*b*, the third length s503*b* and the fourth length s504*b* of the third pattern element 50*b*.

At least one of the first length s501*a*, the second length s502*a*, the third length s503*a* and the fourth length s504*a* of the second pattern element 50*a* may be different than at least one of the first length s501*b*, the second length s502*b*, the third length s503*b* and the fourth length s504*b* of the third pattern element 50*b*.

At least two of the first length s501*a*, the second length s502*a*, the third length s503*a* and the fourth length s504*a* of the second pattern element 50*a* may be equal to at least two of the first length s501*b*, the second length s502*b*, the third length s503*b* and the fourth length s504*b* of the third pattern element 50*b*.

At least two of the first length s501*a*, the second length s502*a*, the third length s503*a* and the fourth length s504*a* of the second pattern element 50*a* may be different than at least two of the first length s501*b*, the second length s502*b*, the third length s503*b* and the fourth length s504*b* of the third pattern element 50*b*.

The angle between the second side 502 of the first pattern element 50 and the third side 503 of the first pattern element 50 may be less than an angle between the second side 502*a* of the second pattern element 50*a* and the third side 503*a* of the second pattern element 50*a*.

The angle between the second side 502*a* of the second pattern element 50*a* and the third side 503*a* of the second pattern element 50*a* may be less than an angle between the second side 502*b* of the third pattern element 50*b* and the third side 503*b* of the third pattern element 50*b*.

Figure 13:
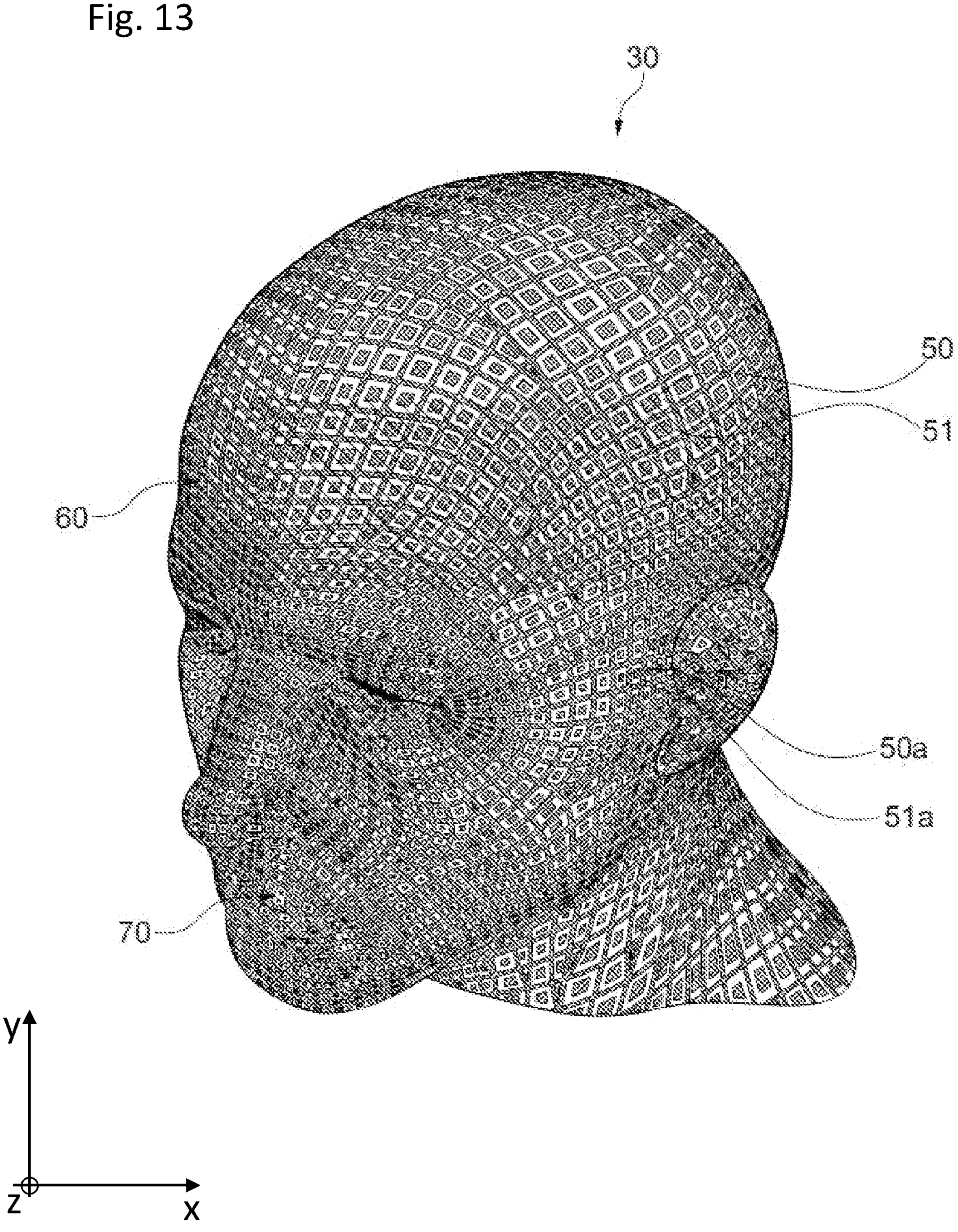
FIG. 13 shows a pattern 30.

FIG. 13 represents a pattern 30. The pattern 30 is visible (perceptible) to a viewer in a motif region 20 of a security element 10 at a first viewing angle.

The pattern 30 comprises a plurality of pattern elements 50, 50*a*. The pattern elements 50, 50*a* may have contours 51, 51*a*.

In the pattern 30, a motif 60 is three-dimensionally visible to a viewer. The motif in this example is a human head.

The pattern elements 50, 50*a*, in particular the contours 51, 51*a* of the pattern elements 50, 50*a*, are distorted in such a way that a three-dimensional impression of the human head results. The effect for the viewer is thus as if an area having pattern elements 50, 50*a* were placed in a regular grid over the human head so that the three-dimensional impression is obtained.

By tilting the security element about a first axis, a first kinematic effect may be perceptible to the viewer in the pattern 30. For example, the human head may turn in relation to the neck which is indicated, so that the face of the head is visible more frontally. Alternatively, the human head may be lifted or lowered in relation to the neck which is indicated, so that the face of the head changes position vertically (nodding head). Alternatively, the impression that the pattern elements 50 move may be imparted to the viewer. Movement of the pattern elements 50 may be configured and perceptible to the viewer substantially identically to the movement of the pattern elements 50 as described with reference to FIGS. 3 and 4.

An additional motif 70, for example a brightly acting section, may be visible to the viewer in the motif 60 or the pattern 30.

By tilting the security element about a second axis, a second kinematic effect may be perceptible to the viewer in the pattern 30. For example, the additional motif 70 may be perceived as moving or rolling in the direction of the y axis. The additional motif 70 may be moved in the positive direction of the y axis by the tilting when the security element 10 is tilted in one direction. The additional motif 70 may be moved in the negative direction of the y axis by the tilting when the security element 10 is tilted in another direction.

Figure 14:
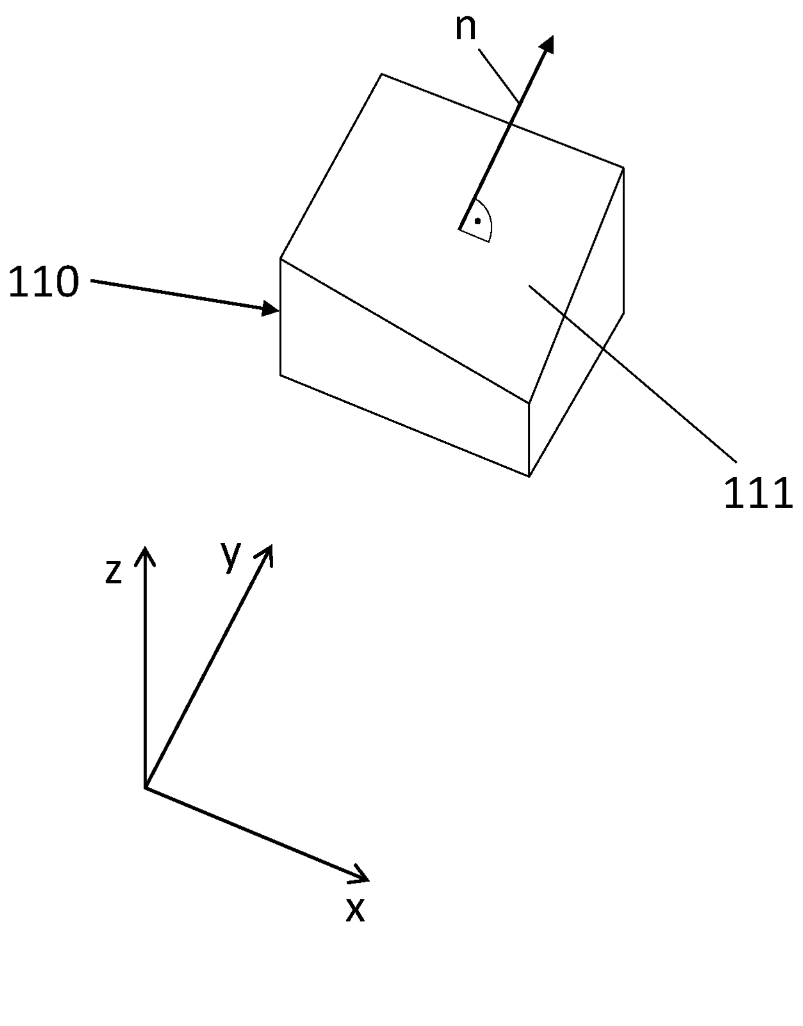
FIG. 14 shows a micromirror 110 having a facet 111.

FIG. 14 schematically shows a facet 111. The facet 111 may be a plane-surface area. The facet 111 may be tilted relative to an x-y plane having an x axis and a y axis. The facet 111 may be tilted both in the direction of the x axis and in the direction of the y axis. A z axis may be oriented perpendicularly to the x-y plane.

The facet 111 may define a normal vector n. The normal vector n may extend with a first orientation component and a second orientation component in the direction of the z axis. The facet 111 may be a surface of a microreflector 110, in particular of a micromirror.

A first kinematic effect described herein may be established by the first orientation component of the normal vector n. A second kinematic effect described herein may be established by the second orientation component of the normal vector n.

The first kinematic effect may be independent of the second orientation component of the normal vector n. The second kinematic effect may be independent of the first orientation component of the normal vector n.

A multiplicity of facets 111 may be arranged in the motif region 20. By reflection of light of a light source by the multiplicity of facets 111, different optical impressions may be perceptible to the viewer as a function of the position of the security element 10.

In general, a spacing may be the shortest distance between objects (for example between two submotifs) in a direction, preferably in the x direction or in the y direction.

In general, different may mean different by at least 10 μm. Different may mean between 100 μm and 500 μm different.

Equal may mean a deviation of at most ±10%, preferably at most ±5%, more preferably ±3%, more preferably ±1%.

The invention claimed is:

1. An optically variable security element having a motif region, wherein (a) a multiplicity of variously aligned facets are arranged in the motif region, (b) a pattern having visible pattern elements is visible to a viewer in the motif region at least at a first viewing angle, (c) wherein the visible pattern elements have shapes that are differently configured in order to represent a motif for the viewer, (d) wherein the motif is a three-dimensional motif that imparts an impression to a viewer that a pattern having pattern elements with identical shapes has been placed on a three-dimensional surface, and (e) wherein the shapes of the pattern elements are differently configured such that they represent a perspective of the three-dimensional motif for the viewer.

2. The optically variable security element according to claim 1, wherein during tilting of the optically variable security element about an axis which lies in a plane of the security element, a kinematic effect is perceptible to the viewer in the pattern, a movement of at least one of the pattern elements or a movement of the three-dimensional motif or a movement of an additional independent motif in the motif region.

3. The optically variable security element according to claim 2, wherein the kinematic effect is perceptible to the viewer by:

a variation of contours of pattern elements; and/or by a variation of positions of pattern elements; and/or by a variation of areas of the pattern elements; and/or by a variation of sizes of the pattern elements; and/or by a variation of shapes of the pattern elements; and/or by a variation of a position of a brightly acting first perceptible section that exhibits a higher relative reflected light intensity in a direction of the viewer than a second perceptible section.

4. The optically variable security element according to claim 2, wherein the kinematic effect is a movement of an independent additional motif, including a movement of an additional motif having an independent geometrical motif shape, comprising a brightly acting first perceptible section or is a brightly acting first perceptible section, wherein the brightly acting first perceptible section exhibits a higher relative reflected light intensity in a direction of the viewer than a second perceptible section.

5. The optically variable security element according to claim 1, wherein the visible pattern elements comprise:

perspectively distorted pattern elements, which are visible to the viewer in the motif in such a way that the pattern elements are perceptible as converging at a common vanishing point, and/or undistorted pattern elements, which are visible to the viewer outside the motif.

6. The optically variable security element according to claim 1, wherein a first pattern element of the pattern elements is perspectively distorted differently than a second pattern element of the pattern elements in such a way that the pattern elements are perceptible as converging at a common vanishing point.

7. The optically variable security element according to claim 1, wherein the pattern elements are:

submotifs; or line pattern elements, including L-shaped or cruciform pattern elements; or area pattern elements, including filled area pattern elements; or area contour pattern elements, including pattern elements having a contour or a frame.

8. The optically variable security element according to claim 1, wherein the visible pattern elements are independent pattern elements or connected pattern elements.

9. The optically variable security element according to claim 1, wherein a first kinematic effect is perceptible to the viewer in the pattern by tilting the optically variable security element about a first axis which lies in a plane of the security element, and a second kinematic effect is perceptible to the viewer in the pattern by tilting the optically variable security element about a second axis which lies in a plane of the security element, the first axis and the second axis being nonparallel.

10. The optically variable security element according to claim 9, wherein the first kinematic effect is a movement of the pattern elements or a movement of the three-dimensional motif.

11. The optically variable security element according to claim 9, wherein the second kinematic effect is a movement of additional, independent, motif, including a movement of a brightly acting first perceptible section that exhibits a higher relative reflected light intensity in a direction of the viewer than a second perceptible section.

12. The optically variable security element according to claim 1, wherein the motif is perceptible to the viewer in the pattern as a nonplanar or curved surface of the pattern.

13. The optically variable security element according to claim 1, wherein at least some of the pattern elements are perceptible in a regular or irregular grid, wherein pattern elements are perceptible in a regular grid outside the motif and an irregular grid inside the motif, the irregular grid inside the motif having an impression of a regular grid placed on a three-dimensional object such that a three-dimensional impression is obtained.

14. The optically variable security element according to claim 1, wherein the motif is perceptible in the pattern by a distortion, including a perspective distortion, of the pattern elements.

15. The optically variable security element according to claim 1, wherein:

the optically variable security element comprises an arrangement of microreflectors and each of the facets is respectively a surface of a microreflector, wherein the microreflectors are micromirrors; and/or the facets comprise a relief structure having a reflection-increasing coating, including a metal coating, an optically variable coating; and/or the arrangement comprises an embossed embossing lacquer layer.

16. The optically variable security element of claim 15, wherein the optically variable coating is a liquid crystal coating or an optically variable multilayer structure, or an HRI coating.

17. A document of value having an optically variable security element according to claim 1.

* * * * *